United States Patent
Ramloll

(10) Patent No.: US 9,530,326 B1
(45) Date of Patent: Dec. 27, 2016

(54) SYSTEMS AND METHODS FOR IN-SITU GENERATION, CONTROL AND MONITORING OF CONTENT FOR AN IMMERSIVE 3D-AVATAR-BASED VIRTUAL LEARNING ENVIRONMENT

(71) Applicant: Rameshsharma Ramloll, New Rochelle, NY (US)

(72) Inventor: Rameshsharma Ramloll, New Rochelle, NY (US)

(73) Assignee: Rameshsharma Ramloll, Landisville, PA (US)

( * ) Notice: Subject to any disclaimer, the term of this patent is extended or adjusted under 35 U.S.C. 154(b) by 292 days.

(21) Appl. No.: 14/320,561

(22) Filed: Jun. 30, 2014

Related U.S. Application Data

(60) Provisional application No. 61/841,380, filed on Jun. 30, 2013.

(51) Int. Cl.
*G09B 5/02* (2006.01)
*G06F 3/0481* (2013.01)
*G09B 9/00* (2006.01)

(52) U.S. Cl.
CPC .............. *G09B 5/02* (2013.01); *G06F 3/04815* (2013.01); *G06F 3/04817* (2013.01); *G09B 9/00* (2013.01)

(58) Field of Classification Search
CPC ........... G09B 7/07; G09B 7/073; G09B 7/077; G09B 9/00; G06Q 10/10
See application file for complete search history.

(56) References Cited

U.S. PATENT DOCUMENTS

| | | | |
|---|---|---|---|
| 7,403,220 B2 | 7/2008 | MacIntosh et al. | |
| 7,797,261 B2 | 9/2010 | Yang | |
| 8,406,682 B2 * | 3/2013 | Elesseily | G06Q 10/06 434/219 |
| 2008/0187896 A1 | 8/2008 | Savitsky | |
| 2009/0276288 A1 | 11/2009 | Hlavac et al. | |
| 2010/0003652 A1 * | 1/2010 | Lavie | G06Q 10/10 434/219 |
| 2012/0123758 A1 | 5/2012 | Kevan | |
| 2013/0130207 A1 * | 5/2013 | Russell | G09B 5/00 434/107 |
| 2014/0331179 A1 * | 11/2014 | Tullis | G06Q 10/10 715/811 |

FOREIGN PATENT DOCUMENTS

| | | |
|---|---|---|
| CA | 2749510 A1 | 2/2012 |
| CN | 101777271 A | 7/2010 |

* cited by examiner

*Primary Examiner* — Peter Egloff

(57) ABSTRACT

A method comprises displaying, to a user, via an electronic display, an avatar corresponding to the user disposed in front of a virtual control board disposed within a virtual environment; receiving, from the user, input via one or more input apparatus associated with the electronic display, such input corresponding to selection of an item from a menu associated with the virtual control board; receiving, from the user, input corresponding to placement of the selected item on the virtual control board; creating, in the virtual environment in response to the placement of the selected item, a to-scale object corresponding to the selected item; and displaying, on the virtual control board disposed within the virtual environment, an icon corresponding to the created object and animating such icon to reflect status changes of the created object.

20 Claims, 35 Drawing Sheets

SYSTEMS AND METHODS FOR IN-SITU GENERATION, CONTROL AND MONITORING OF CONTENT FOR AN IMMERSIVE 3D-AVATAR-BASED VIRTUAL LEARNING ENVIRONMENT

CROSS-REFERENCE TO RELATED APPLICATION

The present application is a U.S. nonprovisional patent application of, and claims priority under 35 U.S.C. §119(e) to, U.S. provisional patent application Ser. No. 61/841,380, filed Jun. 30, 2013, which provisional patent application is incorporated by reference herein. A copy of this provisional is attached hereto as Appendix A. The present application hereby incorporates herein by reference the entire disclosure of this appendix.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to virtual reality applications, and, in particular, to rapid generation, control and monitoring of large scale custom virtual learning environments.

Background

Conventional software tools to build virtual reality environments include a set of standalone applications such as 3d modeling applications, animation development applications and game engines. In contrast, applications that are accessed from within 3D virtual environments themselves through avatar interactions are known as inworld tools/applications. Currently, both normal standalone sets of tools and inworld tools typically require users with a background in fields such as graphics design and computer programming. Traditionally, the set of software applications designed to facilitate the production of virtual environment process are also known as level editors or world editors which allow users to create virtual environments, make changes to loaded environments and to save new or modified environments as files which can be loaded at a later stage. Level editors or world builders can also include visual programming interfaces that enable users to customize the behavior of various components of the virtual world. Such virtual reality (VR) environment authoring applications typically are designed to function separately from virtual environments they help produce.

SUMMARY OF THE PRESENT INVENTION

Broadly defined, the present invention according to one aspect includes a method comprising displaying, to a user, via an electronic display, an avatar corresponding to the user disposed in front of a virtual control board disposed within a virtual environment; receiving, from the user, input via one or more input apparatus associated with the electronic display, such input corresponding to selection of an item from a menu associated with the virtual control board; receiving, from the user, input corresponding to placement of the selected item on the virtual control board; creating, in the virtual environment in response to the placement of the selected item, a to-scale object corresponding to the selected item; and displaying, on the virtual control board disposed within the virtual environment, an icon corresponding to the created object.

In a feature of this aspect, the object is an inanimate object.

In a feature of this aspect, the object is an animated object controlled by an algorithm.

In a feature of this aspect, the object is a tree.

In a feature of this aspect, the object is a non-player character.

In a feature of this aspect, the method further comprises determining that a status of the object has changed, and modifying the icon displayed on the virtual control board that corresponds to the object in order to depict the changed status of the object.

Broadly defined, the present invention according to another aspect includes a method comprising displaying, to a user, via an electronic display, an avatar corresponding to the user disposed in front of a virtual control board disposed within a virtual environment; receiving, from the user, input via one or more input apparatus associated with the electronic display, such input corresponding to selection of an item from a menu associated with the virtual control board; receiving, from the user, input corresponding to placement of the selected item on the virtual control board; creating, in the virtual environment in response to the placement of the selected item, a to-scale object corresponding to the selected item; displaying, on the virtual control board disposed within the virtual environment, an icon corresponding to the created object; determining that a status of the created object has changed; and updating, on the virtual control board disposed within the virtual environment, the icon corresponding to the created object based on the determined status change.

In a feature of this aspect, the object comprises a non-player character, and wherein the step of determining that a status of the created object has changed comprises determining that the non-player character is suffocating. For example, the non-player character might be suffocating as a result of a gas leak.

Another aspect relates to a method for training a plurality of students in an interactive training scenario utilizing an interactive virtual environment that includes loading, at one or more computing devices forming part of a computing cloud, an interactive virtual environment; communicating, from one or more computing devices forming part of the computing cloud to a first computing device associated with an instructor, data corresponding to the interactive virtual environment; effecting display, at a display device associated with the first computing device, of the interactive virtual environment based on the data corresponding to the interactive virtual environment communicated to the first computing device, the interactive virtual environment including a plurality of elements, and a virtual control board disposed within the interactive virtual environment, the virtual control board including a surface map comprising a plurality of icons corresponding to one or more of the plurality of elements of the interactive virtual environment, wherein the virtual control board is configured to allow a virtual user of the virtual control board to modify existing elements of the interactive virtual environment, the virtual control board is configured to allow a virtual user of the virtual control board to create new elements in the interactive virtual environment, the surface map comprising the plurality of icons is continuously updated to reflect status changes of elements of the interactive virtual environment, including status changes based on user modification via the virtual control board, and new elements created via the virtual control board; receiving, at the first computing device from the instructor via one or more input devices associated with the first computing device, first input corresponding to interaction with the virtual control board that represents creation of a plurality of new elements for the interactive virtual environment; communicating, from the first computing device to one or more computing devices forming part of the computing cloud, data representing the first input corresponding to interaction with the virtual control board; effecting display, at the display device associated with the first computing device, of the interactive virtual environment including the virtual control board updated such that the virtual control board includes new icons corresponding to the new elements in the interactive virtual environment created based on the interaction with the virtual control board; communicating, from one or more computing devices forming part of the computing cloud to a second computing device associated with a first student, data corresponding to the interactive virtual environment; effecting display, at a display device associated with the second computing device, of the interactive virtual environment based on the data corresponding to the interactive virtual environment communicated to the second computing device; communicating, from one or more computing devices forming part of the computing cloud to a third computing device associated with a second student, data corresponding to the interactive virtual environment; effecting display, at a display device associated with the third computing device, of the interactive virtual environment based on the data corresponding to the interactive virtual environment communicated to the third computing device; receiving, at the second computing device from the first student via one or more input devices associated with the second computing device, second input corresponding to interaction with a first element of the interactive virtual environment; communicating, from the second computing device to one or more computing devices forming part of the computing cloud, data representing the second input corresponding to interaction with the first element; communicating, from one or more computing devices forming part of the computing cloud to the third computing device associated with the second student, data corresponding to an update of the interactive virtual environment which includes an update to the first element based on the first student's interaction with the first element; effecting display, at a display device associated with the third computing device, of the interactive virtual environment updated based on the data corresponding to the interactive virtual environment communicated to the third computing device which includes an update to the first element; communicating, from one or more computing devices forming part of the computing cloud to the first computing device associated with the instructor, data corresponding to an update of the interactive virtual environment which includes an update to the first element based on the first student's interaction with the first element; effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element; receiving, at the first computing device from the instructor via one or more input devices associated with the first computing device, third input corresponding to interaction with the virtual control board that represents modification of an existing second element of the interactive virtual environment; communicating, from the first computing device to one or more computing devices forming part of the computing cloud, data representing the third input corresponding to interaction with the virtual control board; effecting display, at a display device associated with the first computing device, of the interactive virtual environment updated based on the interaction with the virtual control board, the updated interactive virtual environment including an updated second element and an updated icon of the interactive virtual control board corresponding to the second element; communicating, from one or more computing devices forming part of the computing cloud to the second computing device associated with the first student, data corresponding to an update of the interactive virtual environment which includes an update to the second element based on the instructor's interaction with the virtual control board; effecting display, at the display device associated with the second computing device, of the interactive virtual environment including the virtual control board updated to reflect the modification of the existing second element of the interactive virtual environment based on the interaction with the virtual control board; communicating, from one or more computing devices forming part of the computing cloud to the third computing device associated with the second student, data corresponding to an update of the interactive virtual environment which includes an update to the second element based on the instructor's interaction with the virtual control board; effecting display, at the display device associated with the third computing device, of the interactive virtual environment including the virtual control board updated to reflect the modification of the existing second element of the interactive virtual environment based on the interaction with the virtual control board; wherein the instructor is an instructor for an interactive training scenario for the first and second students, the created plurality of new elements for the interactive virtual environment are created for the interactive training scenario, the interaction with the first element is part of the interactive training scenario, and the modification of the existing second element is performed for the interactive training scenario.

In a feature of this aspect, one or more of the created plurality of elements is an inanimate object.

In a feature of this aspect, one or more of the created plurality of elements is an animated object controlled by an algorithm.

In a feature of this aspect, one or more of the created plurality of elements is a non-player character.

In a feature of this aspect, the display device associated with the first computing device comprises a head mounted display.

In a feature of this aspect, the display device associated with the second computing device comprises a virtual reality headset.

In a feature of this aspect, the display device associated with the third computing device displays an immersive 3d environment.

In a feature of this aspect, the display device associated with the first computing device comprises a monitor.

In a feature of this aspect, the first element is a door, and wherein the interaction with the first element comprises opening the door.

Another aspect relates to one or more computer readable media containing computer executable instructions for performing a disclosed method.

Another aspect relates to a method comprising loading, at one or more computing devices forming part of a computing cloud, an interactive virtual environment; communicating, from one or more computing devices forming part of the computing cloud to a first computing device associated with a first user, data corresponding to the interactive virtual environment; effecting display, at a display device associated with the first computing device, of the interactive virtual environment based on the data corresponding to the interactive virtual environment communicated to the first computing device, the interactive virtual environment including a plurality of elements, and a virtual control board disposed within the interactive virtual environment, the virtual control board including a surface map comprising a plurality of icons corresponding to one or more of the plurality of elements of the interactive virtual environment, wherein the virtual control board is configured to allow a virtual user of the virtual control board to modify existing elements of the interactive virtual environment, the virtual control board is configured to allow a virtual user of the virtual control board to create new elements in the interactive virtual environment, the surface map comprising the plurality of icons is continuously updated to reflect status changes of elements of the interactive virtual environment, including status changes based on user modification via the virtual control board, and new elements created via the virtual control board; receiving, at the first computing device from the first user via one or more input devices associated with the first computing device, first input corresponding to interaction with the virtual control board that represents creation of a plurality of new elements for the interactive virtual environment; communicating, from the first computing device to one or more computing devices forming part of the computing cloud, data representing the first input corresponding to interaction with the virtual control board; effecting display, at the display device associated with the first computing device, of the interactive virtual environment including the virtual control board updated such that the virtual control board includes new icons corresponding to the new elements in the interactive virtual environment created based on the interaction with the virtual control board; communicating, from one or more computing devices forming part of the computing cloud to a second computing device associated with a second user, data corresponding to the interactive virtual environment; effecting display, at a display device associated with the second computing device, of the interactive virtual environment based on the data corresponding to the interactive virtual environment communicated to the second computing device; communicating, from one or more computing devices forming part of the computing cloud to a third computing device associated with a third user, data corresponding to the interactive virtual environment; effecting display, at a display device associated with the third computing device, of the interactive virtual environment based on the data corresponding to the interactive virtual environment communicated to the third computing device; receiving, at the second computing device from the second user via one or more input devices associated with the second computing device, second input corresponding to interaction with a first element of the interactive virtual environment; communicating, from the second computing device to one or more computing devices forming part of the computing cloud, data representing the second input corresponding to interaction with the first element; communicating, from one or more computing devices forming part of the computing cloud to the third computing device associated with the third user, data corresponding to an update of the interactive virtual environment which includes an update to the first element based on the second user's interaction with the first element; effecting display, at a display device associated with the third computing device, of the interactive virtual environment updated based on the data corresponding to the interactive virtual environment communicated to the third computing device which includes an update to the first element; communicating, from one or more computing devices forming part of the computing cloud to the first computing device associated with the first user, data corresponding to an update of the interactive virtual environment which includes an update to the first element based on the second user's interaction with the first element; effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element; receiving, at the first computing device from the first user via one or more input devices associated with the first computing device, third input corresponding to interaction with the virtual control board that represents modification of an existing second element of the interactive virtual environment; communicating, from the first computing device to one or more computing devices forming part of the computing cloud, data representing the third input corresponding to interaction with the virtual control board; effecting display, at a display device associated with the first computing device, of the interactive virtual environment updated based on the interaction with the virtual control board, the updated interactive virtual environment including an updated second element and an updated icon of the interactive virtual control board corresponding to the second element; communicating, from one or more computing devices forming part of the computing cloud to the second computing device associated with the second user, data corresponding to an update of the interactive virtual environment which includes an update to the second element based on the first user's interaction with the virtual control board; effecting display, at the display device associated with the second computing device, of the interactive virtual environment including the virtual control board updated to reflect the modification of the existing second element of the interactive virtual environment based on the interaction with the virtual control board; communicating, from one or more computing devices forming part of the computing cloud to the third computing device associated with the third user, data corresponding to an update of the interactive virtual environment which includes an update to the second element based on the first user's interaction with the virtual control board; and effecting display, at the display device associated with the third computing device, of the interactive virtual environment including the virtual control board updated to reflect the modification of the existing second element of the interactive virtual environment based on the interaction with the virtual control board.

Another aspect relates to a method comprising loading, at one or more computing devices forming part of a computing cloud, an interactive virtual environment; communicating, from one or more computing devices forming part of the computing cloud to a first computing device associated with a first user, data corresponding to the interactive virtual environment; effecting display, at a display device associated with the first computing device, of the interactive virtual environment based on the data corresponding to the interactive virtual environment communicated to the first computing device, the interactive virtual environment including a plurality of elements, and a virtual control board disposed within the interactive virtual environment, the virtual control board including a surface map comprising a plurality of icons corresponding to one or more of the plurality of elements of the interactive virtual environment, wherein the virtual control board is configured to allow a virtual user of the virtual control board to modify existing elements of the interactive virtual environment, the virtual control board is configured to allow a virtual user of the virtual control board to create new elements in the interactive virtual environment, the surface map comprising the plurality of icons is continuously updated to reflect status changes of elements of the interactive virtual environment, including status changes based on user modification via the virtual control board, and new elements created via the virtual control board; receiving, at the first computing device from the first user via one or more input devices associated with the first computing device, first input corresponding to interaction with the virtual control board that represents creation of a plurality of new elements for the interactive virtual environment; communicating, from the first computing device to one or more computing devices forming part of the computing cloud, data representing the first input corresponding to interaction with the virtual control board; effecting display, at the display device associated with the first computing device, of the interactive virtual environment including the virtual control board updated such that the virtual control board includes new icons corresponding to the new elements in the interactive virtual environment created based on the interaction with the virtual control board; communicating, from one or more computing devices forming part of the computing cloud to a second computing device associated with a second user, data corresponding to the interactive virtual environment; effecting display, at a display device associated with the second computing device, of the interactive virtual environment based on the data corresponding to the interactive virtual environment communicated to the second computing device; receiving, at the second computing device from the second user via one or more input devices associated with the second computing device, second input corresponding to interaction with a first element of the interactive virtual environment; communicating, from the second computing device to one or more computing devices forming part of the computing cloud, data representing the second input corresponding to interaction with the first element; communicating, from one or more computing devices forming part of the computing cloud to the first computing device associated with the first user, data corresponding to an update of the interactive virtual environment which includes an update to the first element based on the second user's interaction with the first element; effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element; receiving, at the first computing device from the first user via one or more input devices associated with the first computing device, third input corresponding to interaction with the virtual control board that represents modification of an existing second element of the interactive virtual environment; communicating, from the first computing device to one or more computing devices forming part of the computing cloud, data representing the third input corresponding to interaction with the virtual control board; effecting display, at a display device associated with the first computing device, of the interactive virtual environment updated based on the interaction with the virtual control board, the updated interactive virtual environment including an updated second element and an updated icon of the interactive virtual control board corresponding to the second element; communicating, from one or more computing devices forming part of the computing cloud to the second computing device associated with the second user, data corresponding to an update of the interactive virtual environment which includes an update to the second element based on the first user's interaction with the virtual control board; and effecting display, at the display device associated with the second computing device, of the interactive virtual environment including the virtual control board updated to reflect the modification of the existing second element of the interactive virtual environment based on the interaction with the virtual control board.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
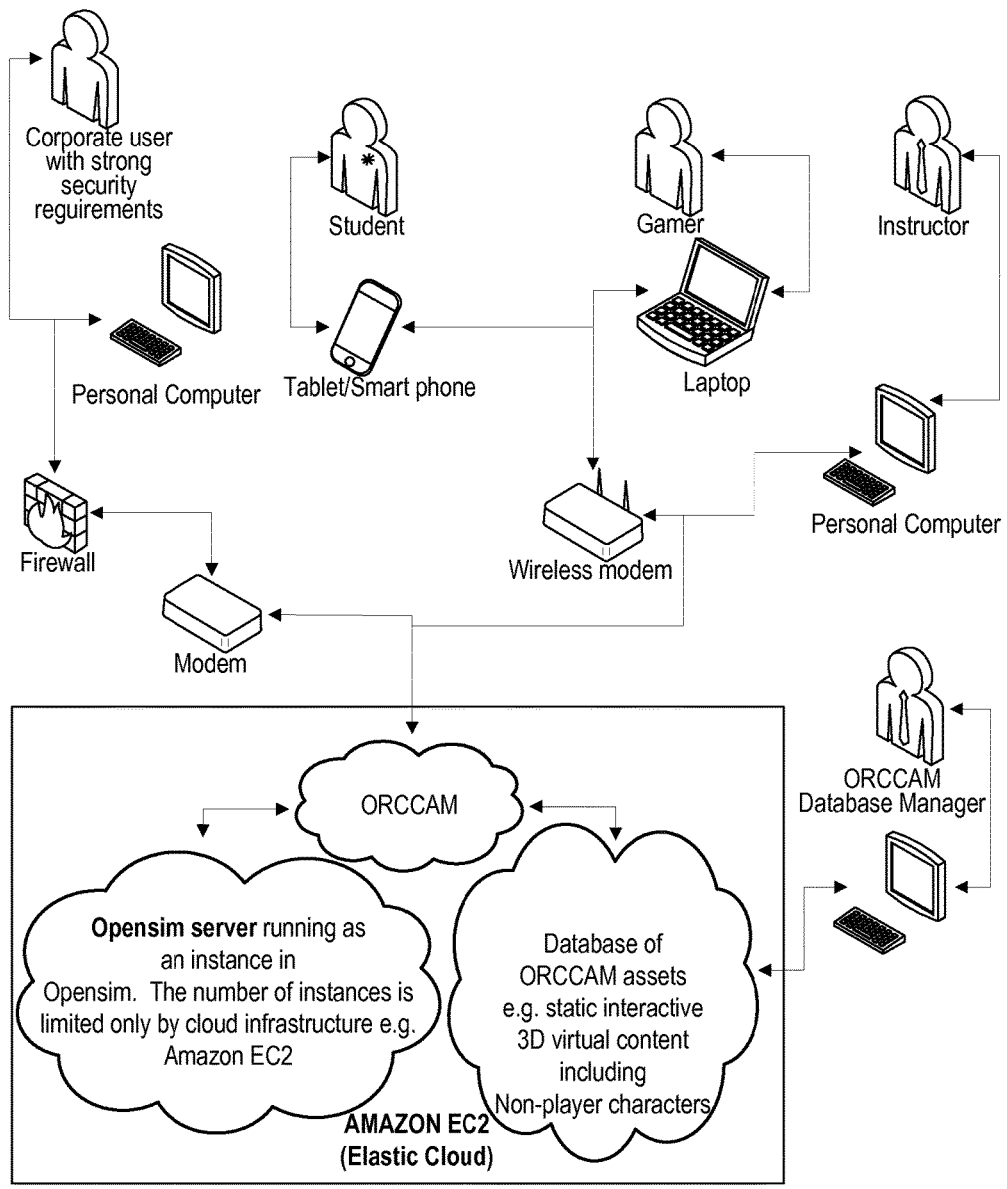
FIG. 1 is a block diagram of a system for in-situ generation, control, and monitoring of content for an immersive 3D-avatar-based virtual learning environment in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Conventional VR authoring software tools, both stand-alone or inworld (accessible within virtual worlds), are typically not designed to allow end users to perform the following three functions concurrently: create, control and monitor 3D content. This functionality is advantageous for users who are subject matter experts (e.g. an emergency preparedness trainer, a nursing professor) but who do not have the programming or graphics design background to rapidly create 3D avatar based virtual reality learning environments to support their educational exercises.

It is believed that such users can benefit from an application that: allows them to create and deploy rapidly (in minutes) their custom environment; helps them control through simple user interface manipulations the behavior of the virtual content; and enables them to have an overview of all events in the produced virtual environment through relevant visualizations. Creation, control and monitoring are helpful for end-users to be able to deploy rapidly and run advanced and highly responsive 3D avatar based virtual learning environments. These three elements can play a major role in increasing the return on investment for virtual reality based training applications.

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

A software application in accordance with one or more preferred embodiments provides a virtual reality (VR) environment which includes an interface disposed within the VR environment which users within the VR environment can interact with, and which is configured to allow users to monitor, modify, and control elements of the VR environment.

The interface, which can be characterized as a control interface, allows a user to place elements, such as trees or buildings, within the VR environment, monitor existing elements, and modify any elements as desired.

Such an application can be characterized as an Omni Remote Creator, Controller, and Monitor (ORCCAM) application. Such an application is a content creation, controller and monitoring application that can be used collaboratively in a virtual environment that will also host the end product, e.g. an interactive virtual reality environment that can be used for training. In one or more preferred implementations, an ORCCAM application provides creation, control and monitoring functionality that can be accessed through a single simplified user interface by multiple users synchronously.

In one or more preferred implementations, creation, control and monitoring functionality is accessed through multiple interfaces that are dedicated to specialized aspects of the virtual environments e.g. one virtual control board can focus on non-player-characters, another on vehicles and a third on local climatic conditions.

Preferably, such application allows users without any prior programming or artistic background or training to create, collaboratively and rapidly, an immersive avatar based virtual reality environment. Users can plan and create custom immersive virtual learning environments they need collaboratively, in real time, and synchronously.

Such an application might be utilized, for example, to allow one or more instructors to dynamically create scenarios within a VR environment, using a control interface disposed within the VR environment, for students or other users to interact with, and further allow the instructor or instructors to monitor and modify the VR environment as he or she or they wish using such control interface. Preferably, the control interface is configured to allow for monitoring of ongoing events in the virtual reality environment through in-context visualizations at the control interface.

In one or more preferred implementations, such a control interface includes a 2D surface map users can interact with. The application might provide, for example, an interactive virtual 2D surface map of the virtual environment and a library of pre-programmed virtual objects that can be selected and dropped on the surface. Each object to be selected and placed on the 2D surface is an iconic representation of a corresponding "to-scale" object that will be generated in the remaining areas of the large scale virtual reality environment. These iconic representations can be moved and interacted with concurrently by multiple users through user avatars. The iconic representations act as remote control points for corresponding scaled objects or elements in the large scale virtual environment. These iconic representations also function as displays to represent user interaction or events in the rest of the large scale virtual environment.

Usability issues related to camera control and navigation in large scale 3D environments are preferably bypassed by enabling users to create a virtual environment by using their avatars to interact with such a 2D surface map through direct user interface manipulations, e.g. left click to select content and left click to locate them on an easy to access 2D surface. In preferred implementations, the application analyzes created content on the 2D surface map in order to generate a corresponding 3D virtual environment in real time at a larger required scale appropriate for the size of user avatars and with content having required pre-programmed behaviors. Preferably, content introduced can be recreated at any chosen scale in the virtual environment.

In preferred implementations, a direct manipulation user interface allows for the controlling of the behavior of objects in the virtual environment. Preferably, such an interface allows users without any programming skills to control the behavior of content that is introduced in the virtual environment. Accordingly, in a preferred methodology of use, instructors can position their avatars in front of a control interface to create and control a virtual learning environment, while trainee avatars can be disposed in the remaining area of a virtual environment that represents an immersive virtual learning environment. In one or more preferred implementations such a control interface, or virtual board, is disposed in a corner of a virtual environment, at least by default, and in one or more preferred implementations such a control interface is movable within the virtual environment.

In one or more preferred implementations, content may have pre-programmed intelligence or behavior associated therewith. For example, a non-user character may be introduced into the virtual reality environment and have its behavior governed by an artificial intelligence routine or algorithm associated therewith. Preferably, users can augment artificially intelligent objects in the virtual environment with human intelligence, thereby increasing the range, diversity and complexity of behaviors in real time.

Preferably, just as local operations at a virtual board have a corresponding effect remotely in the virtual environment, operations and actions in the virtual environment, e.g. actions by other avatars and events happening in the virtual environment, are represented and depicted on the virtual board. Thus, the virtual board preferably not only functions as a remote controller of the virtual environment, but also reflects remote activities and events in the remote environment through in-context animated representations locally on the board. In one or more preferred implementations, this fusion of remote control and monitoring at the same interface is believed to provide a tight control feedback loop that gives rise to a range of interaction opportunities.

One or more preferred implementations are platform agnostic. For example, one or more preferred implementations can be used directly through a touch screen or mouse based desktop interface, or can be accessed in a 360 virtual reality immersive environment accessed through a head mounted display such as the Oculus Rift virtual reality headset, available from Oculus VR, Inc. of Irvine, Calif. One or more preferred implementations are implemented using the Linden Scripting Language (LSL) on the OpenSim platform.

FIG. 1 illustrates an overview of an exemplary system for in-situ generation, control, and monitoring of content for an immersive 3D-avatar-based virtual learning environment in accordance with one or more preferred embodiments of the present invention. As illustrated, the system includes an Opensim server running as an instance in Opensim, as well as a database of assets, e.g. a virtual library of elements and objects that can be utilized to populate a virtual environment. A plurality of users can interact with the system, as depicted. Such users can include students and instructors, as well as other users. Additionally, a database manager preferably oversees and manages the database of assets.

Each user accessing a virtual environment is represented by an avatar within that virtual environment. Such avatar represents an object within the virtual environment. Further, users can utilize an in situ control interface, e.g. a virtual board, disposed within a virtual environment to monitor and control the virtual environment.

Figure 2:
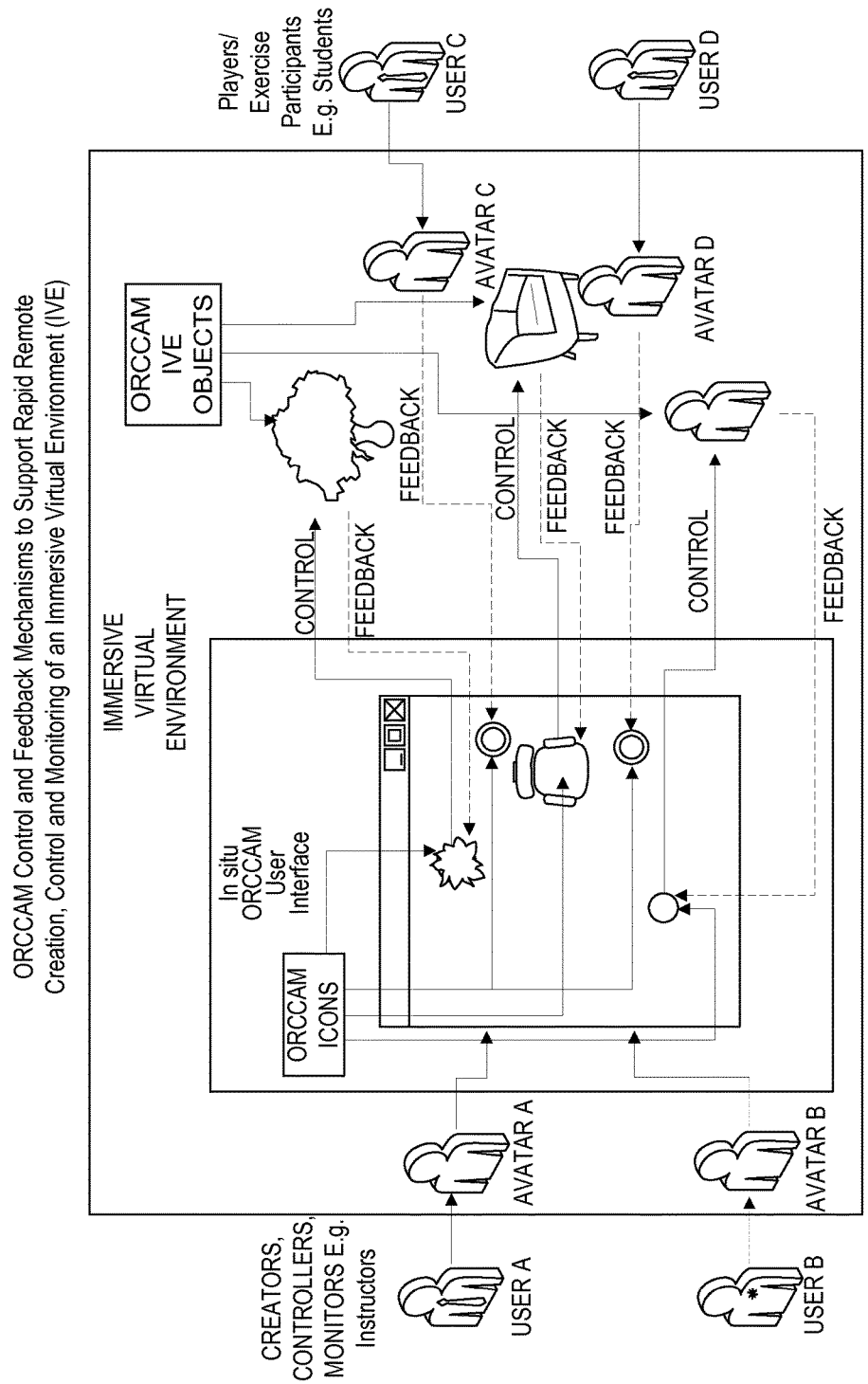
FIG. 2 illustrates the logical relationships between users, their avatars, a control interface, and elements in a virtual environment in accordance with one or more preferred embodiments of the present invention.

In one or more preferred implementations, objects and elements disposed within a virtual environment are depicted as icons on a virtual board disposed within that virtual environment, as illustrated logically in FIG. 2. As illustrated in the figure, the board can be utilized to control elements within the virtual environment, and, further, feedback from the elements informs the display of icons representative of such elements at the virtual board.

FIGS. 3-31 illustrate views of an exemplary virtual reality environment implemented in accordance with one or more preferred implementations.

Figure 3:
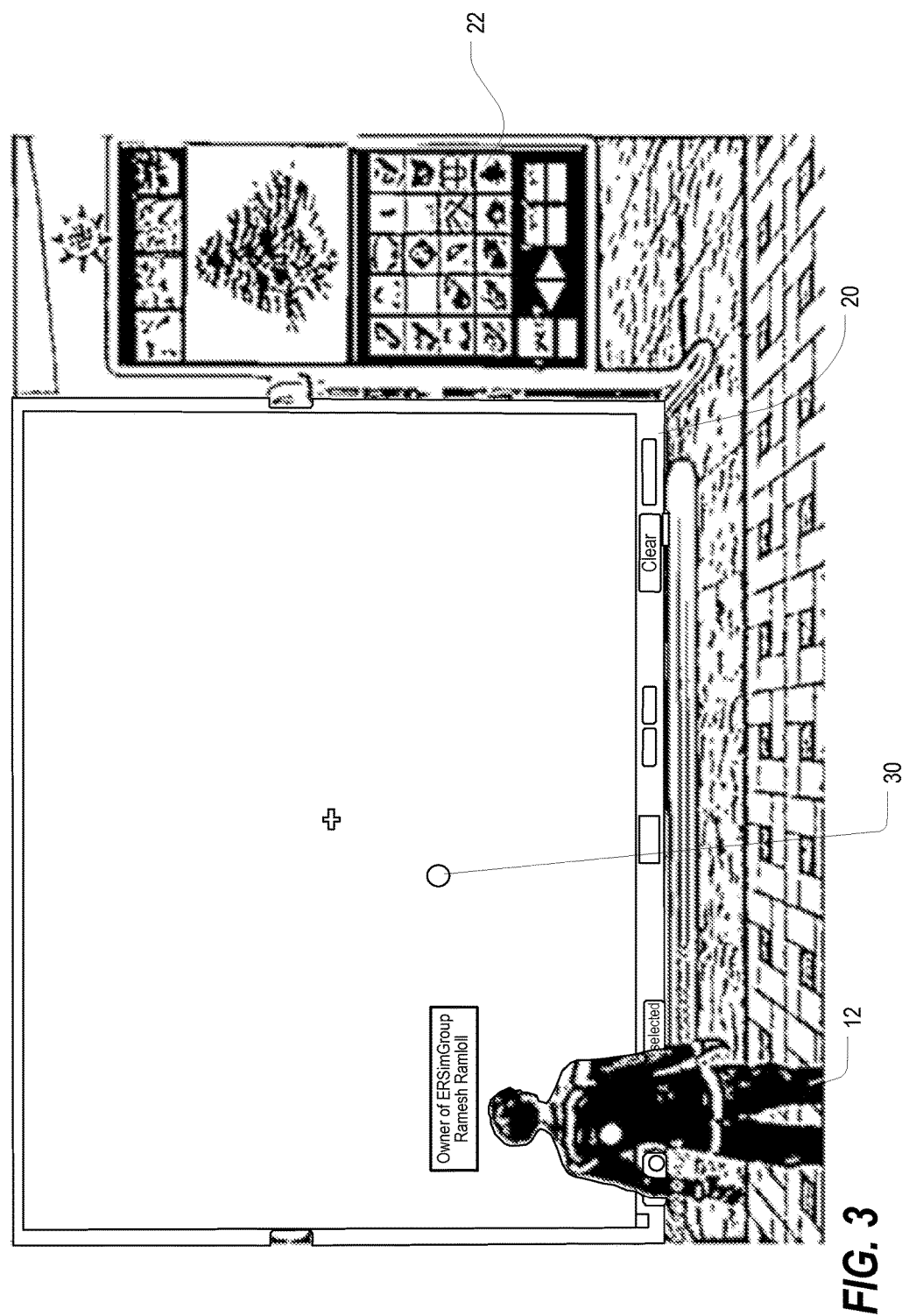
FIGS. 3-31 illustrate views from an exemplary virtual reality environment in accordance with one or more preferred embodiments of the present invention.

FIG. 3 illustrates a user's avatar 12 standing in front of an exemplary control interface in the form of a virtual board 20. The user can move their avatar 12 close to the virtual board 20 and then utilize the virtual board 20 to modify, monitor, and control elements of the virtual reality environment.

For example, in order to create content, a user would select an item from a menu 22 of the virtual board. FIG. 3 illustrates how a user can select a tree item from the menu on the right and place it on the virtual board 20. The tree is represented on the virtual board by an icon 30. This operation causes a scaled up tree 32 to appear in the virtual environment.

Figure 4:
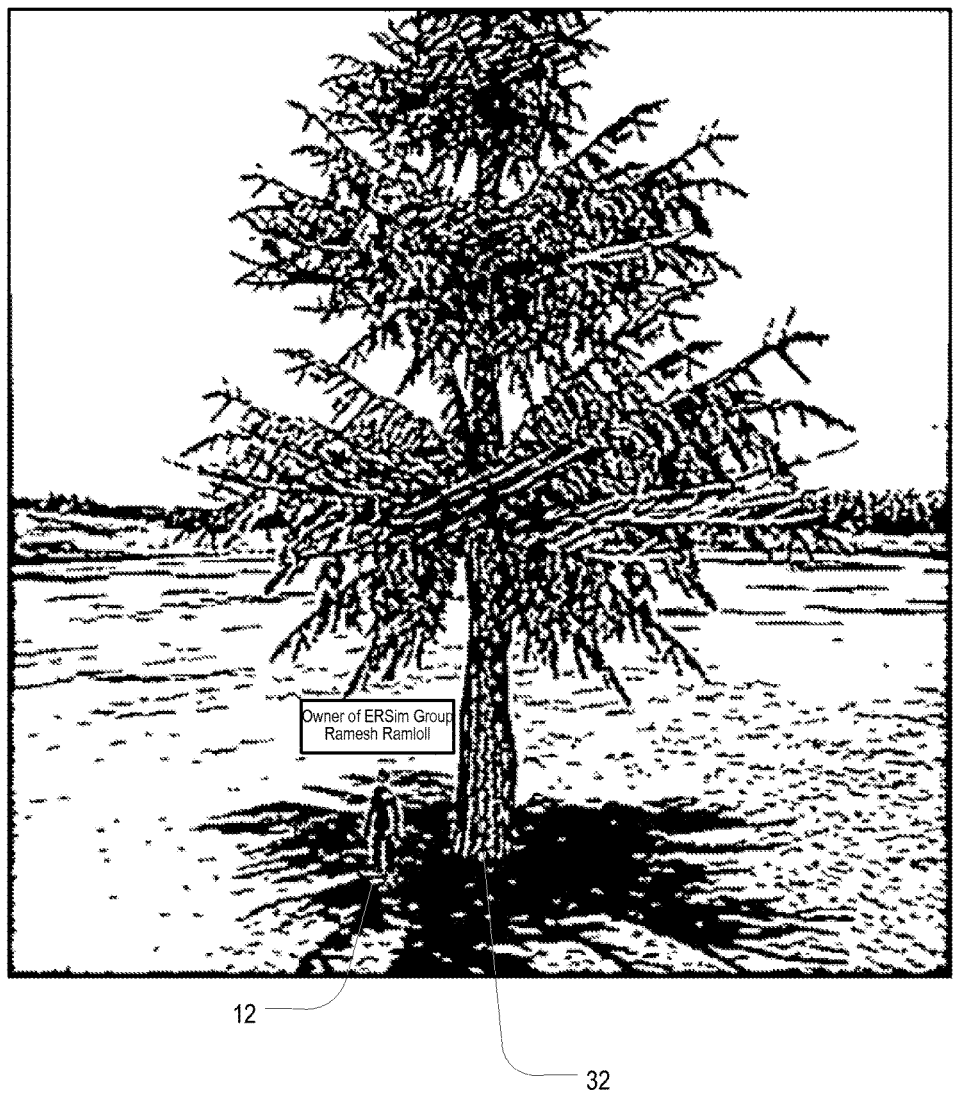
Figure 5:
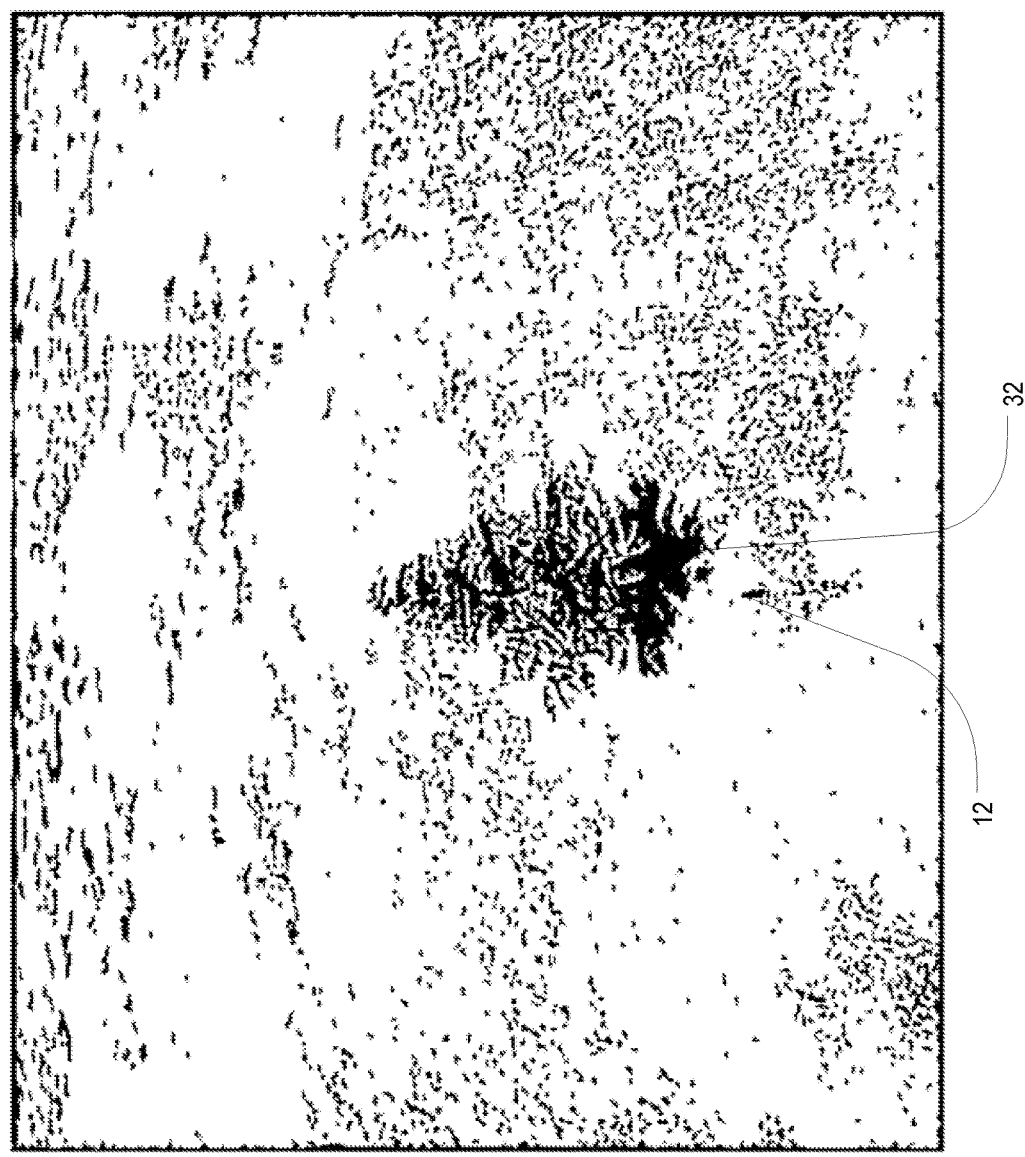

The user can navigate their avatar 12 to the scaled up virtual tree 32 placed appropriately in the virtual environment. FIG. 4 is a screen shot illustrating the user's avatar 12 having been navigated to the tree 32. FIG. 5 is another screen shot taken as a top view illustrating the scale of the user avatar 12 compared to the tree 32.

Figure 6:
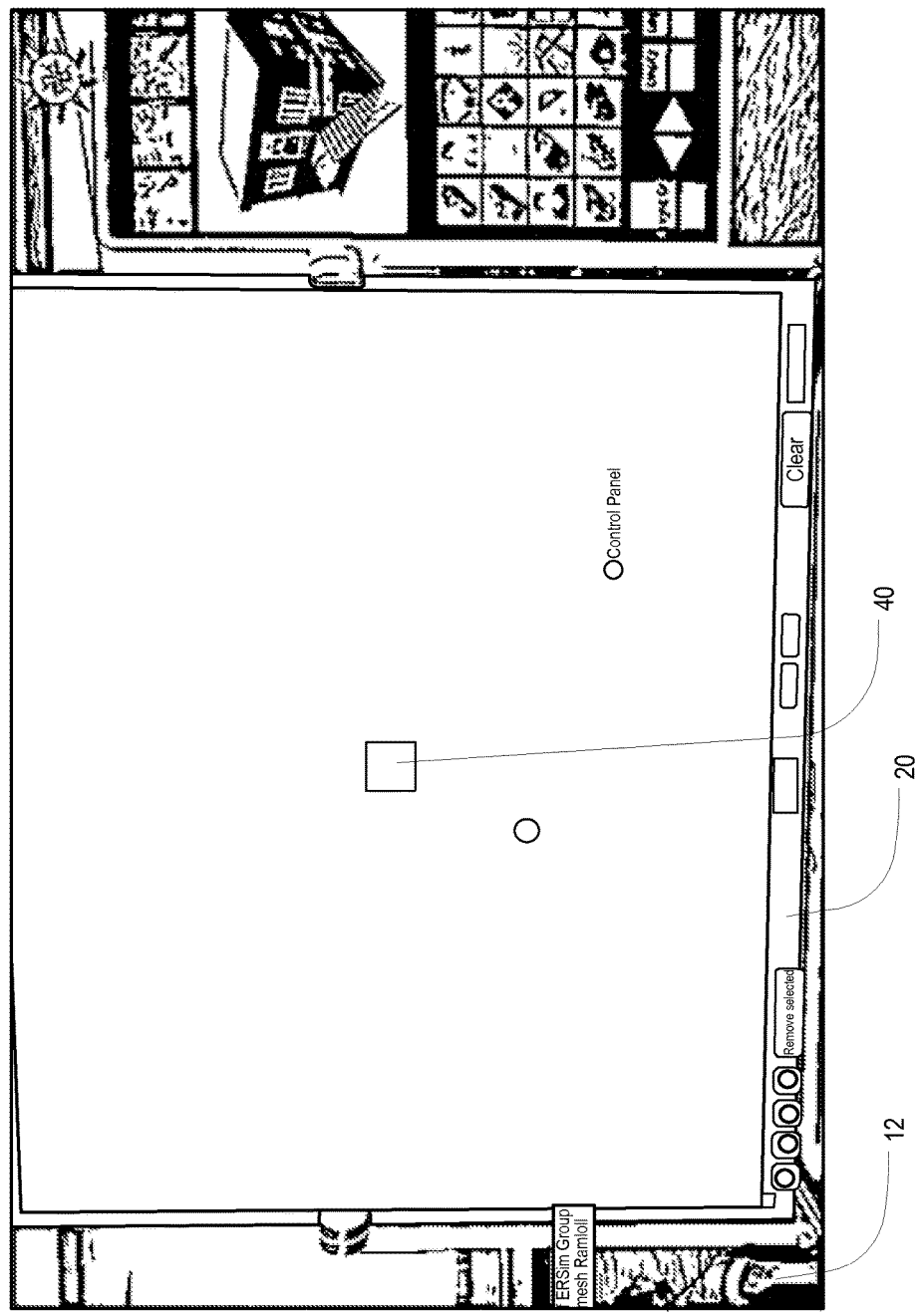

Thereafter, the figure can navigate their avatar 12 back to the virtual board 20, and utilize it to select a house item for placement on the virtual board 20, which effects creation of a scaled up house 42 in the virtual environment. As with the tree 32, the house 42 is represented on the virtual board by a representative icon 40, as illustrated in FIG. 6.

Figure 7:
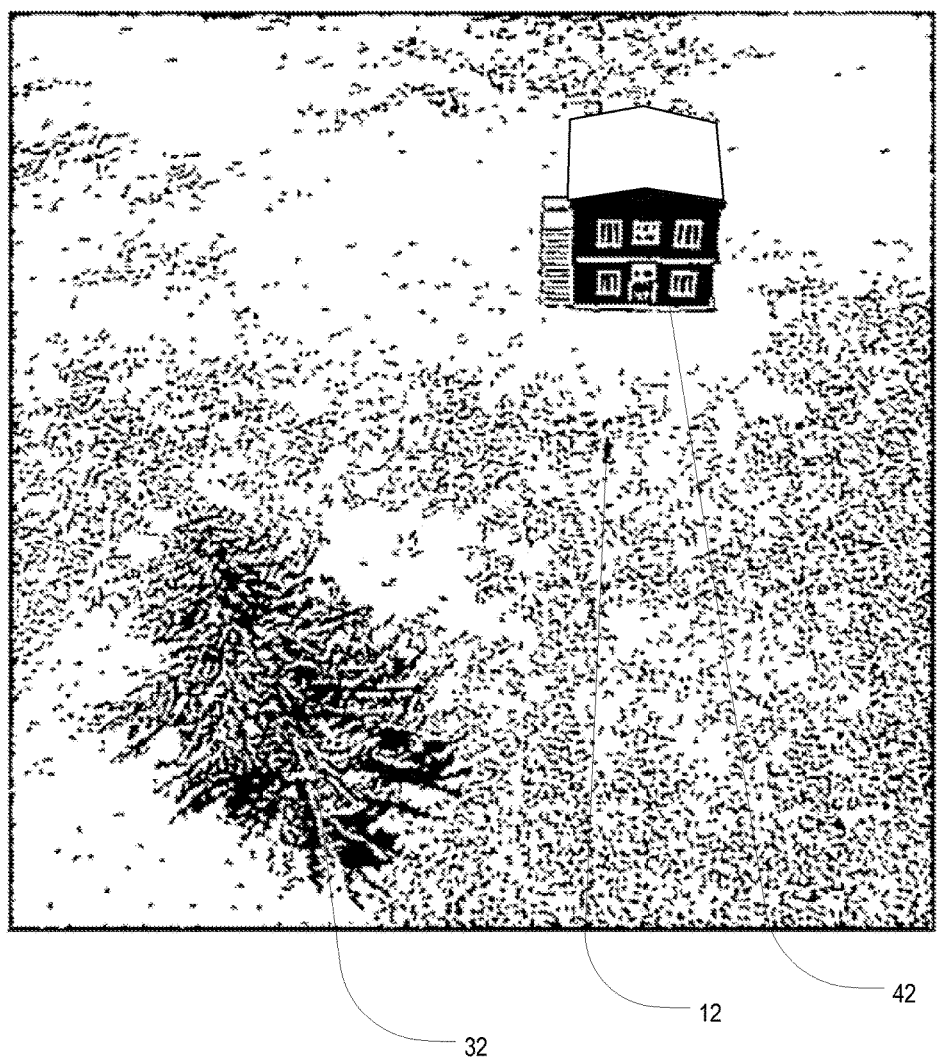

The user can then navigate their avatar 12 back to an area proximate the scaled up virtual tree 32 and house 42 placed appropriately in the virtual environment. FIG. 7 is a screen shot illustrating the user's avatar 12 having been navigated proximate the tree 32 and house 42. This top view illustrates the relative scale of the avatar 12, house 42, and tree 32.

Figure 8:
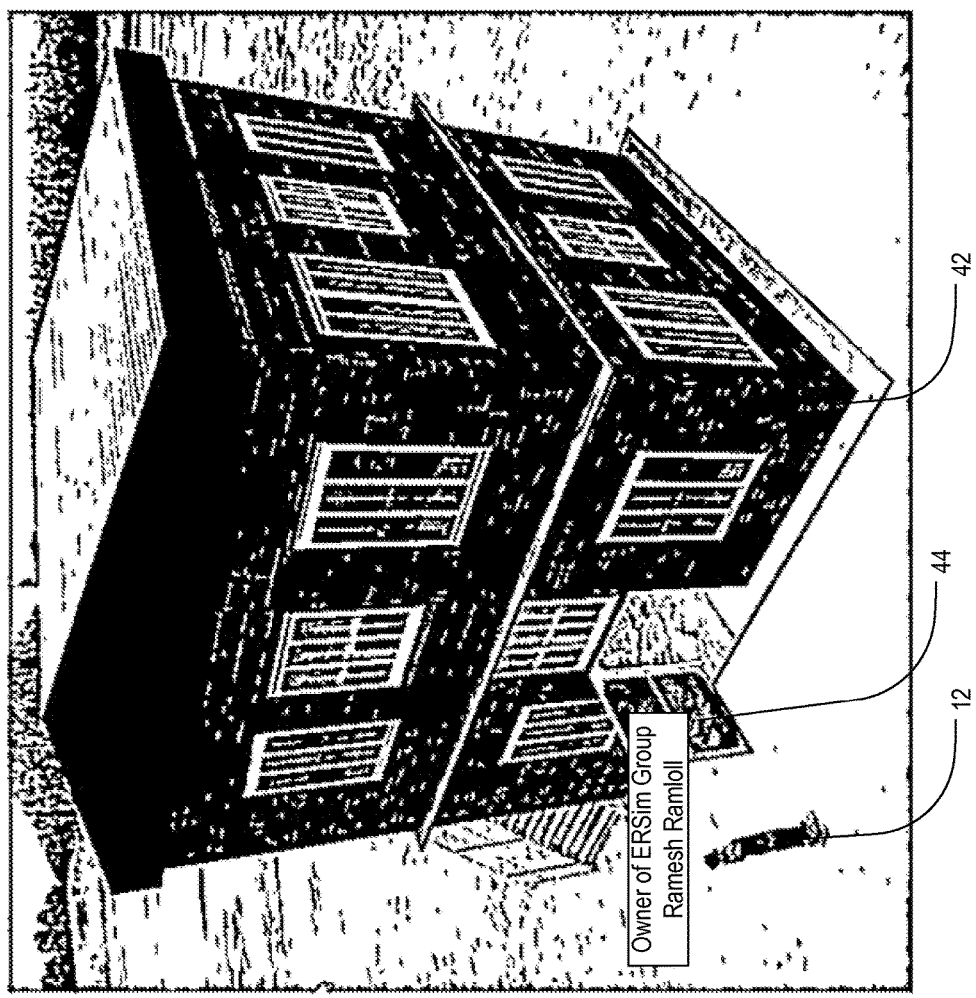

Preferably, content generated in the virtual environment is pre-programmed to offer a required level of interactivity. For example, a door 44 of house 42 can be opened, as illustrated in FIG. 8.

Figure 9:
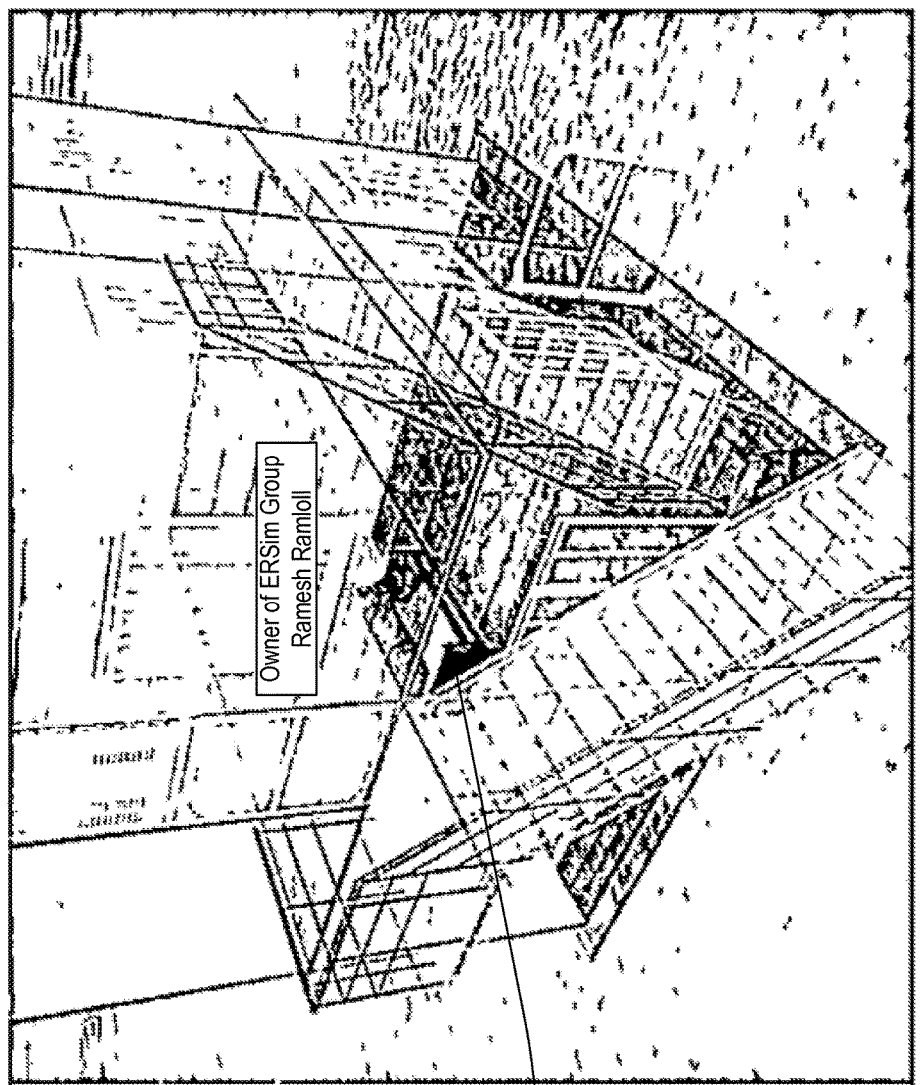

Once the door is open, the user can navigate their avatar 12 inside of the house 42. The house 42 preferably contains other interactive components that the avatar 12 can interact with. For example, FIG. 9 illustrates the user's avatar sitting on a virtual sofa 46 of the house 42. It will be appreciated that the house 42 is rendered translucent in this figure in order to clearly illustrate such interaction.

Figure 10A:
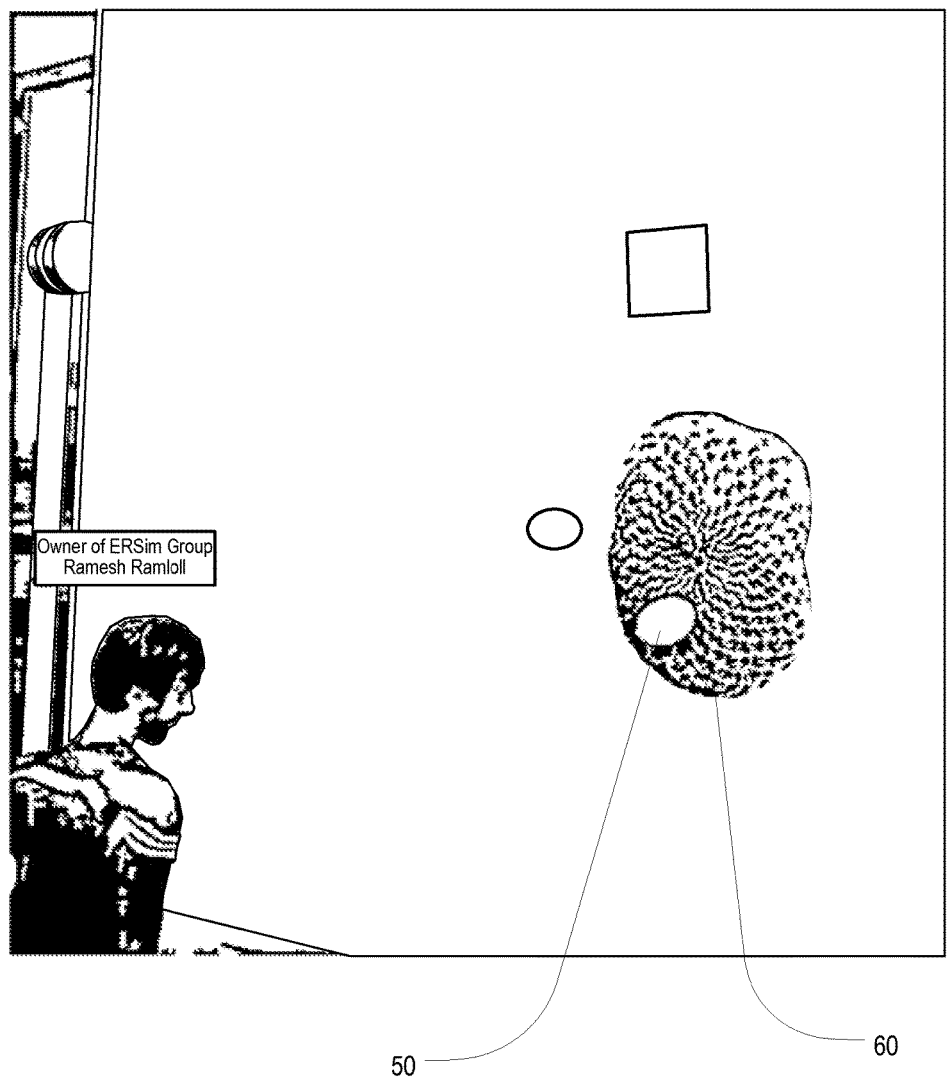
Figure 10B:
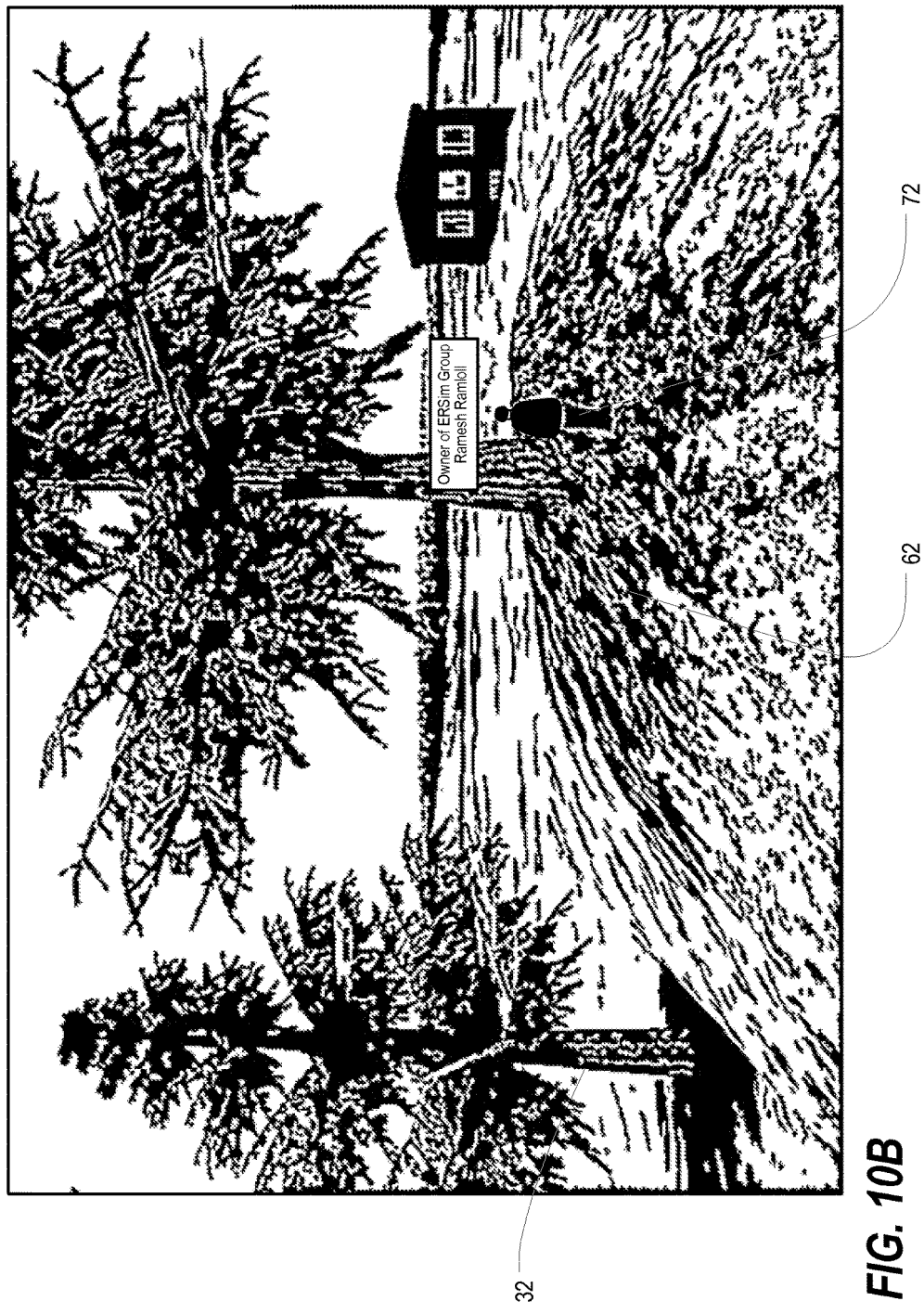

Returning to the virtual board 20, the virtual board 20 is preferably configured to facilitate content creation by automatically positioning and orienting content. For example, a tree can be placed on a hill object simply by clicking on the hill icon 60 where a tree object is desired to be placed. FIG. 10A illustrates a tree icon 50 representative of a tree 52 that has been placed on a hill 62. The user can thereafter navigate their avatar to the hill 62, as illustrated in FIG. 10B.

Figure 11:
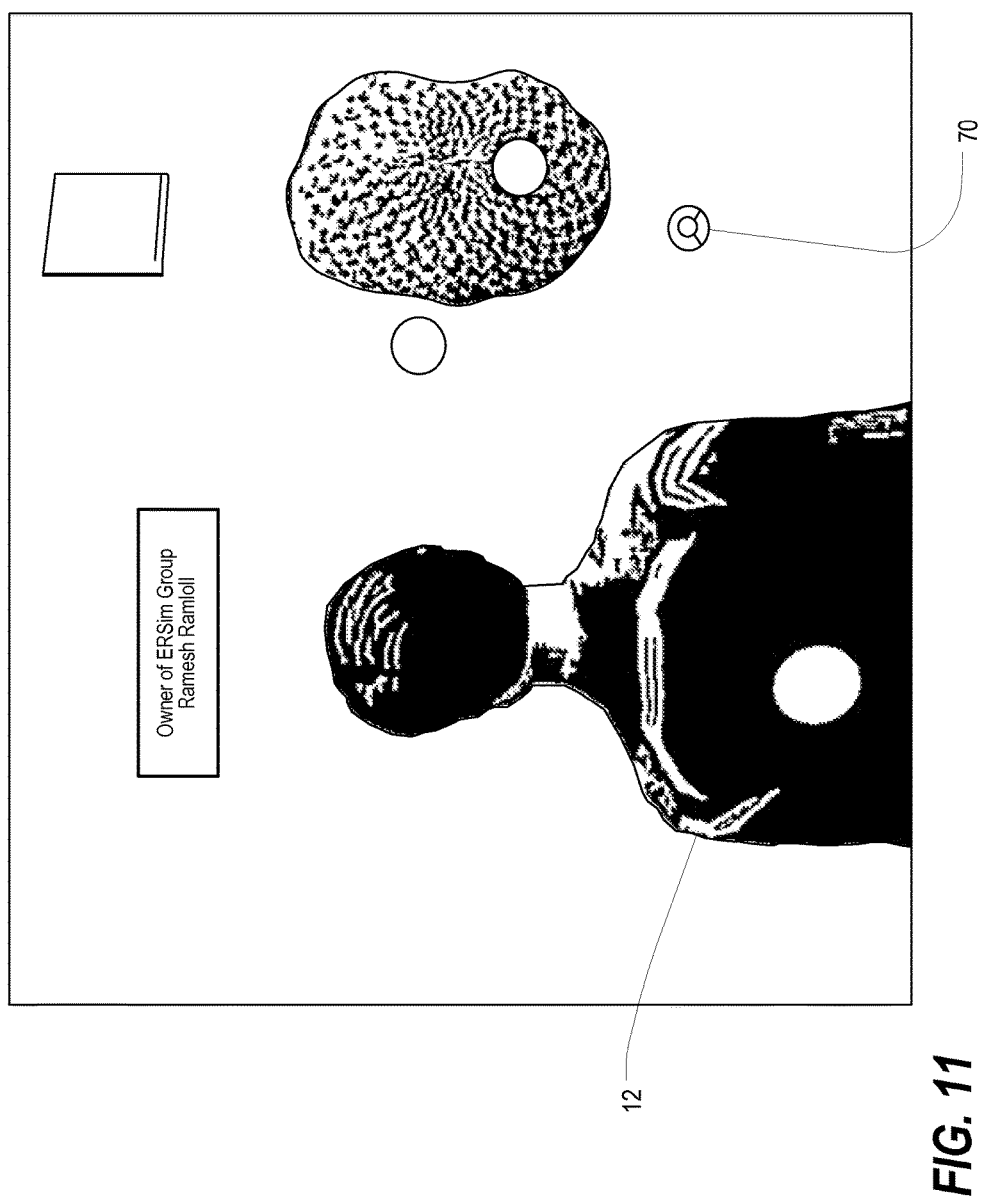
Figure 12:
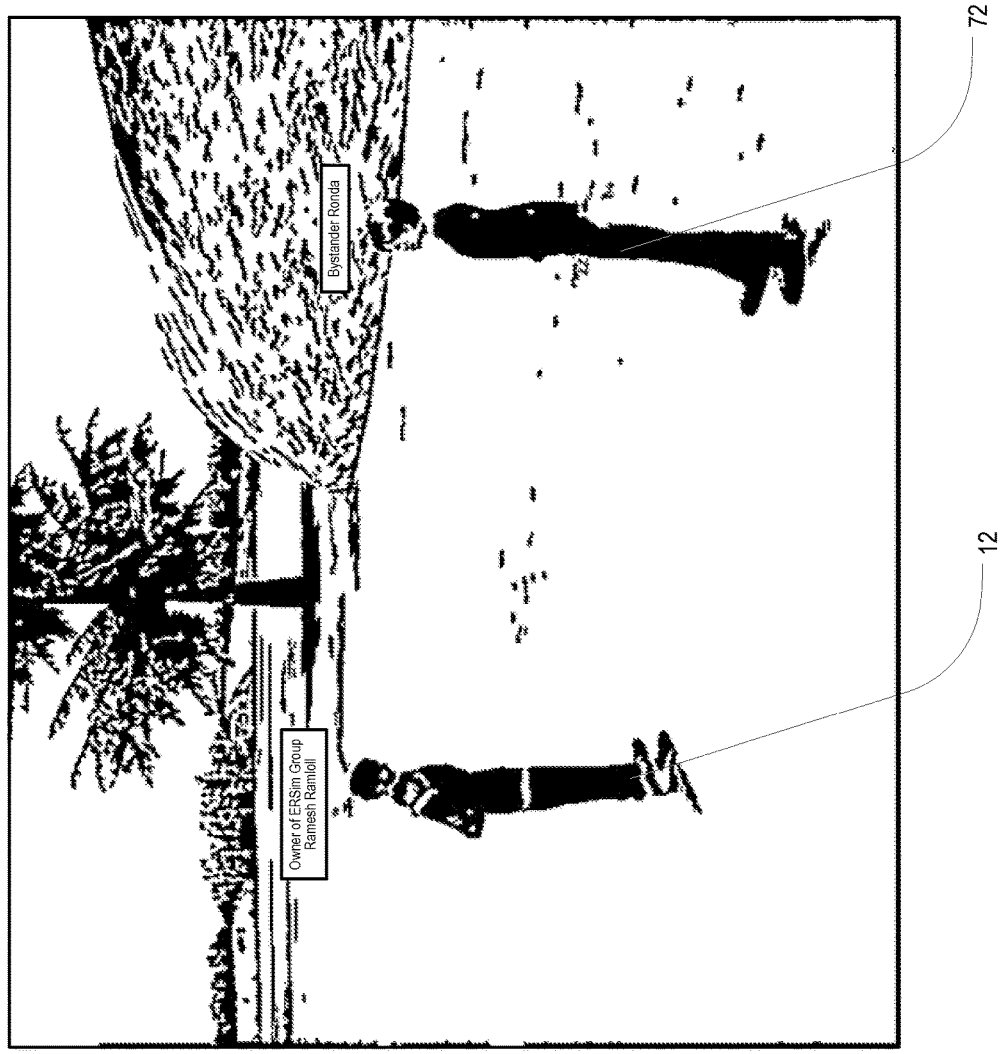

The user can also easily select and place non-player characters into the virtual learning environment. Non-player characters are generally not driven by users in the real world, and instead are typically driven by an artificial intelligence engine that allows them to sense events in the virtual world and respond accordingly. FIG. 11 illustrates an icon 70 representative of placement of a non-player character 72 proximate the hill 62. FIG. 12 illustrates such non-player character 72.

Figure 13:
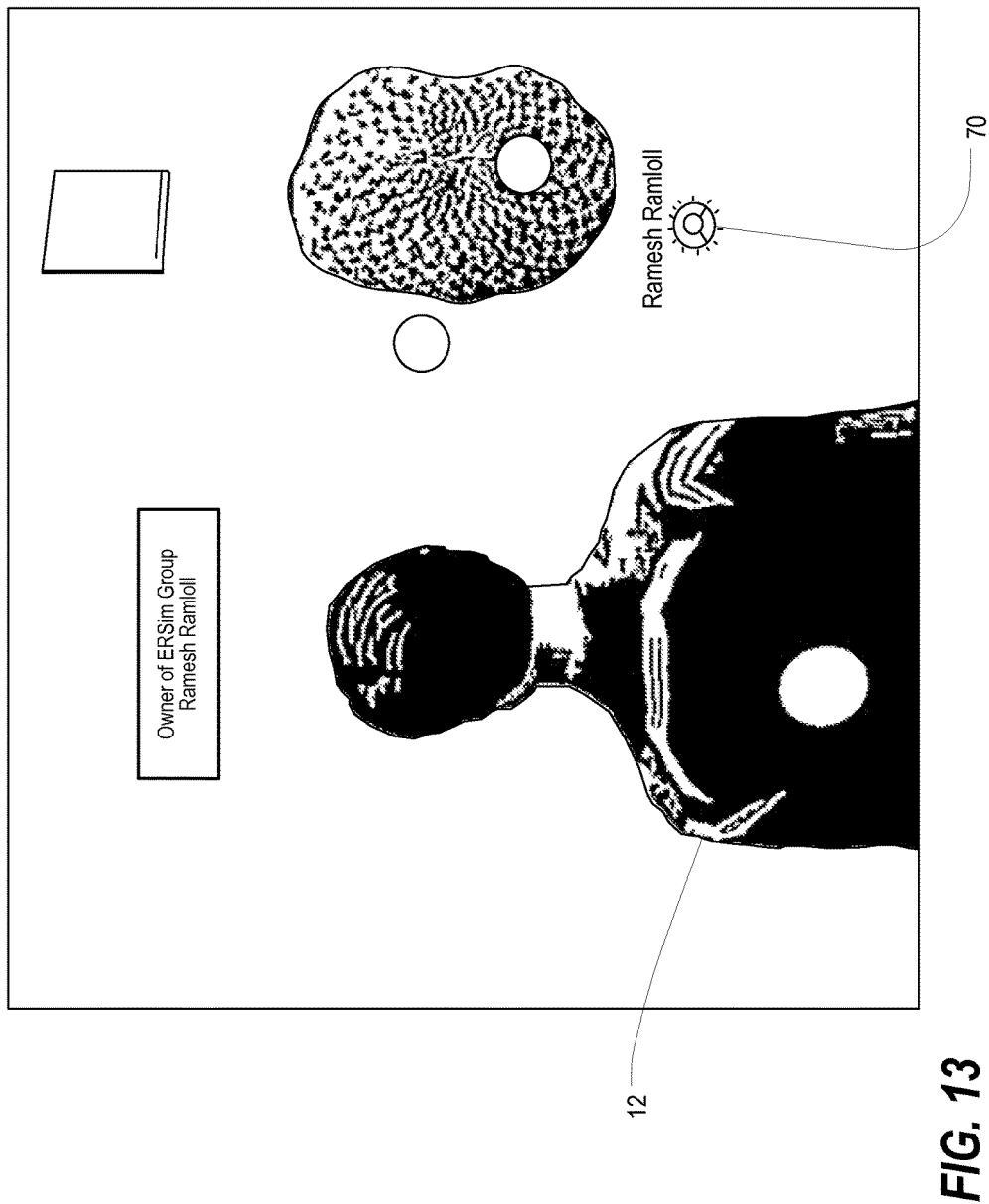

Users can utilize the virtual board 20 to control objects and items in the virtual environment. In a preferred implementation, a user can have their avatar stand in front of the virtual board 20 and select an object to be controlled by left clicking on the object and holding for half a second. FIG. 13 illustrates selection of the non-player character icon 70 by the user controlling the avatar 12. As illustrated, the non-player character icon 70 is highlighted when selected and text is displayed indicating it is being controlled by the user.

Figure 14:
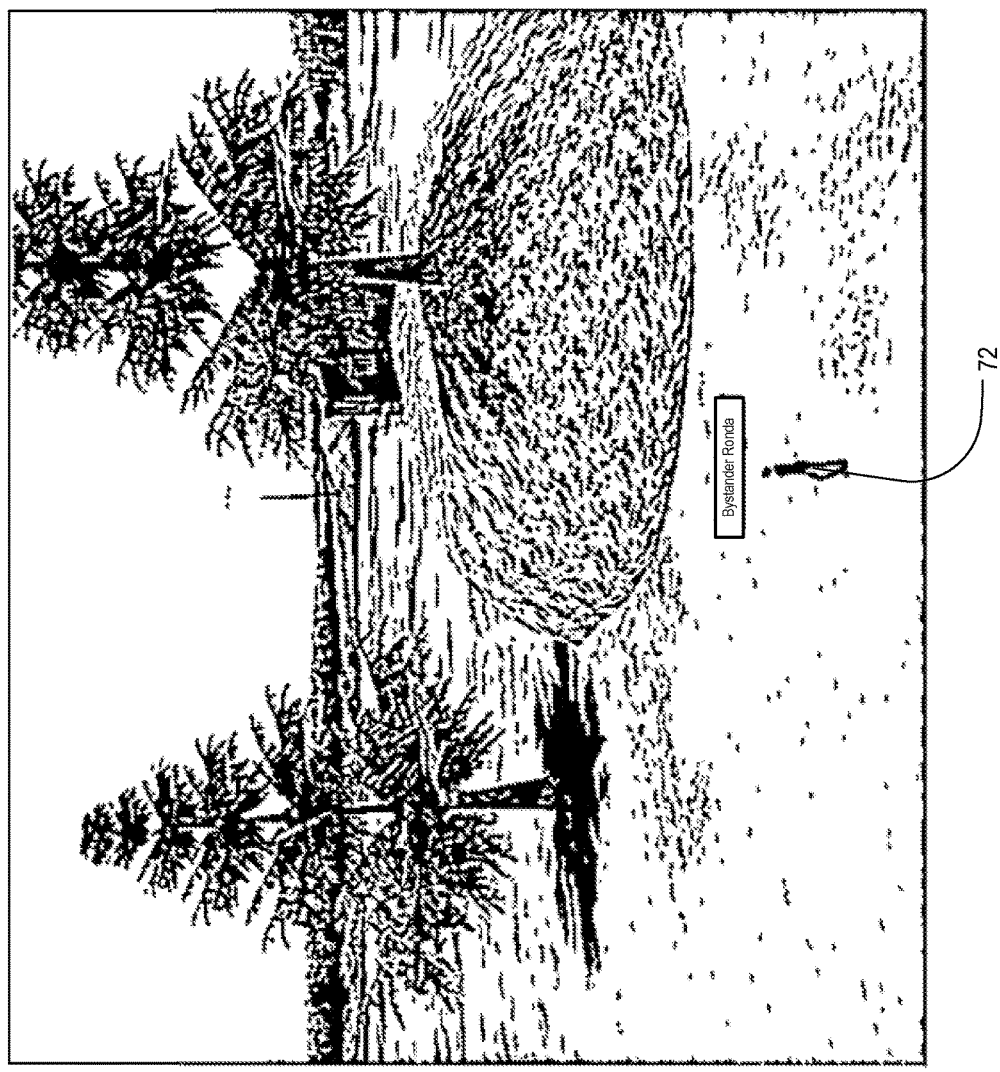

Upon selecting the non-player character icon 70, the user can control the activities of the associated non-player character 72. For example, the non-player character can be instructed to move to a different position, as illustrated in FIG. 14.

Figure 15:
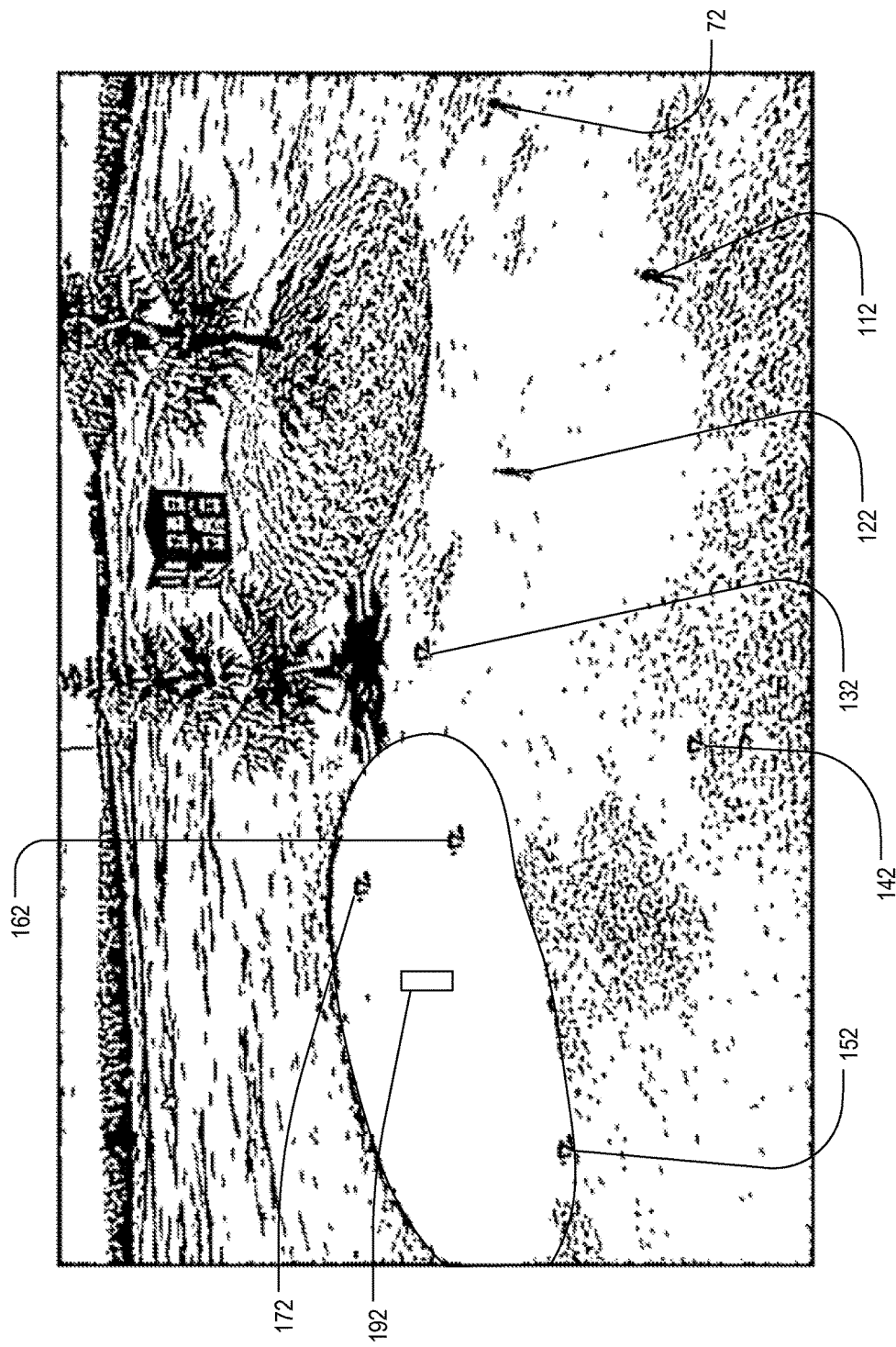
Figure 16:
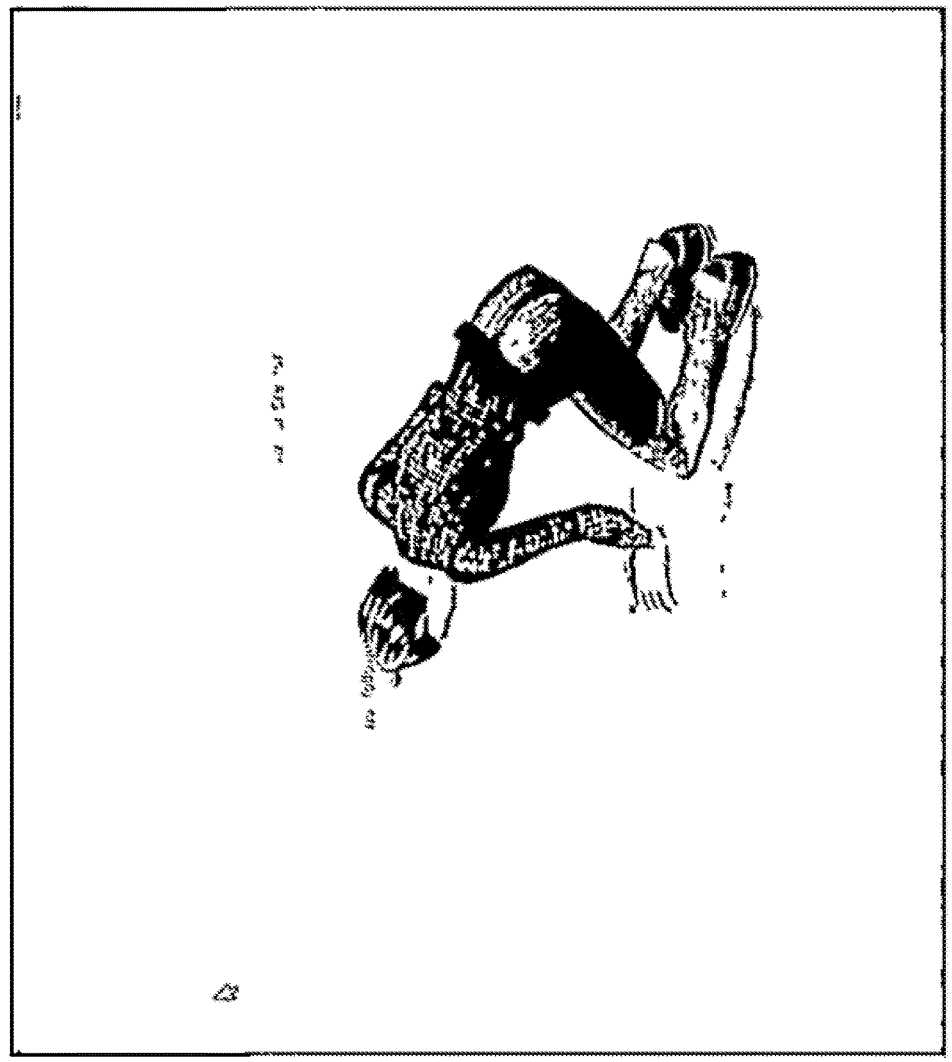

The virtual board 20 can be utilized to control the virtual environment in a myriad of ways. For example, additional non-player characters 112, 122, 132, 142, 152, 162, 172 can be placed in the virtual environment and a gas leak source 192 can be placed in the vicinity of such non-player characters, as illustrated in FIG. 15. In the illustrated preferred implementation, the non-player characters are pre-programmed to collapse if they are within a set range of the leak, as illustrated in FIG. 16. This non-player character is suffocating in the virtual environment because of the gas leak. As illustrated in FIG. 15, the non-player characters 132, 142, 152, 162, 172 within a set range of the gas leak source 192 have collapsed, while the non-player characters 72, 112, 122 outside of such set range have not.

Figure 17:
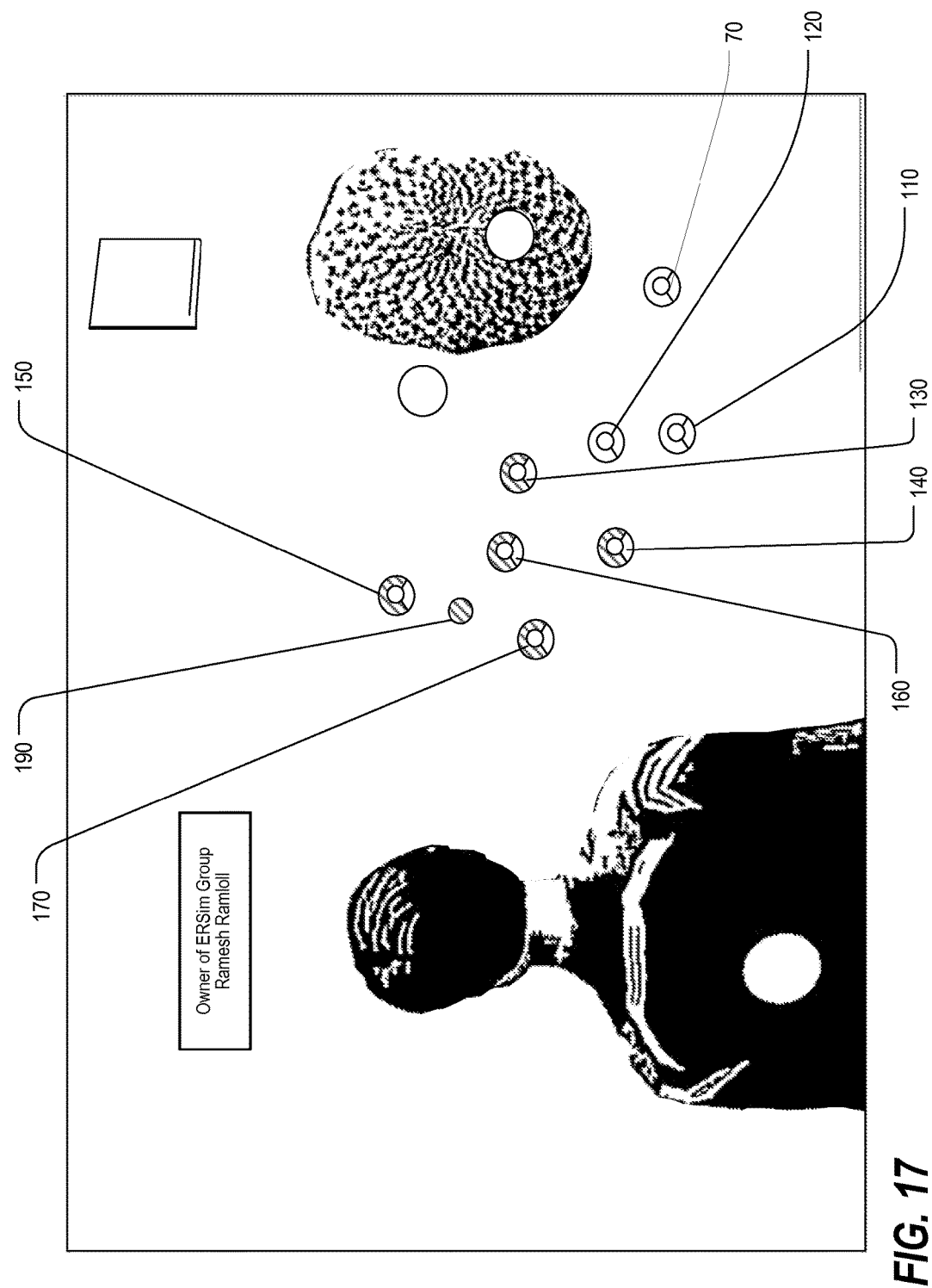

Preferably, the status of elements and items of the virtual environment are illustrated on the virtual board 20. For example, in the gas leak example just described, a current status of the non-player characters is preferably indicated on the virtual board 20, as illustrated in FIG. 17. As can be seen in this figure, the icons 130, 140, 150, 160, 170 representing the non-player characters 132, 142, 152, 162, 172 that are proximate the gas leak source 190 and suffocating are shaded over to indicate they have collapsed and are suffocating. This example illustrates how events in the virtual environment are preferably also represented on the board thereby allowing it to function as a live map of unfolding events.

Figure 18:
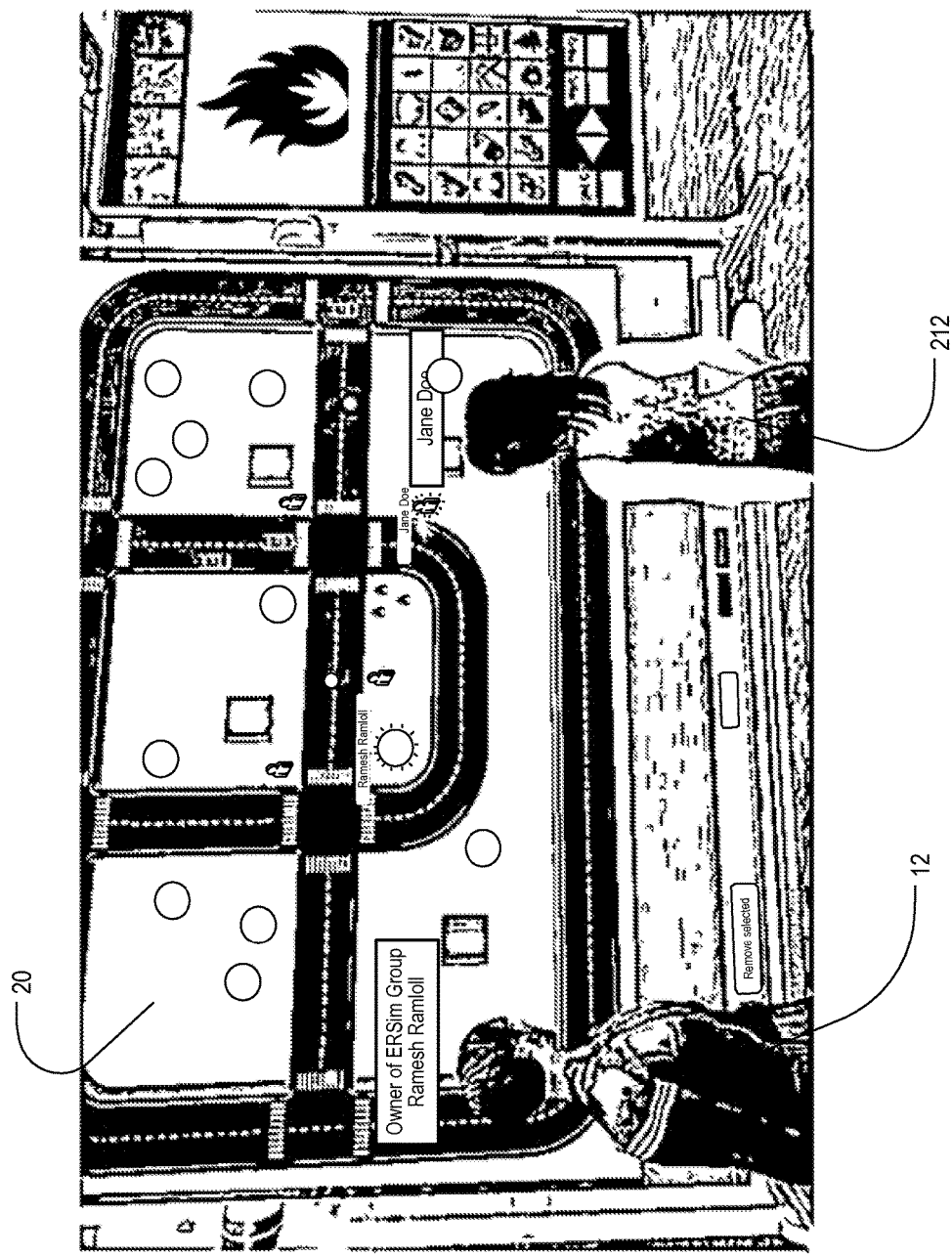
Figure 19:
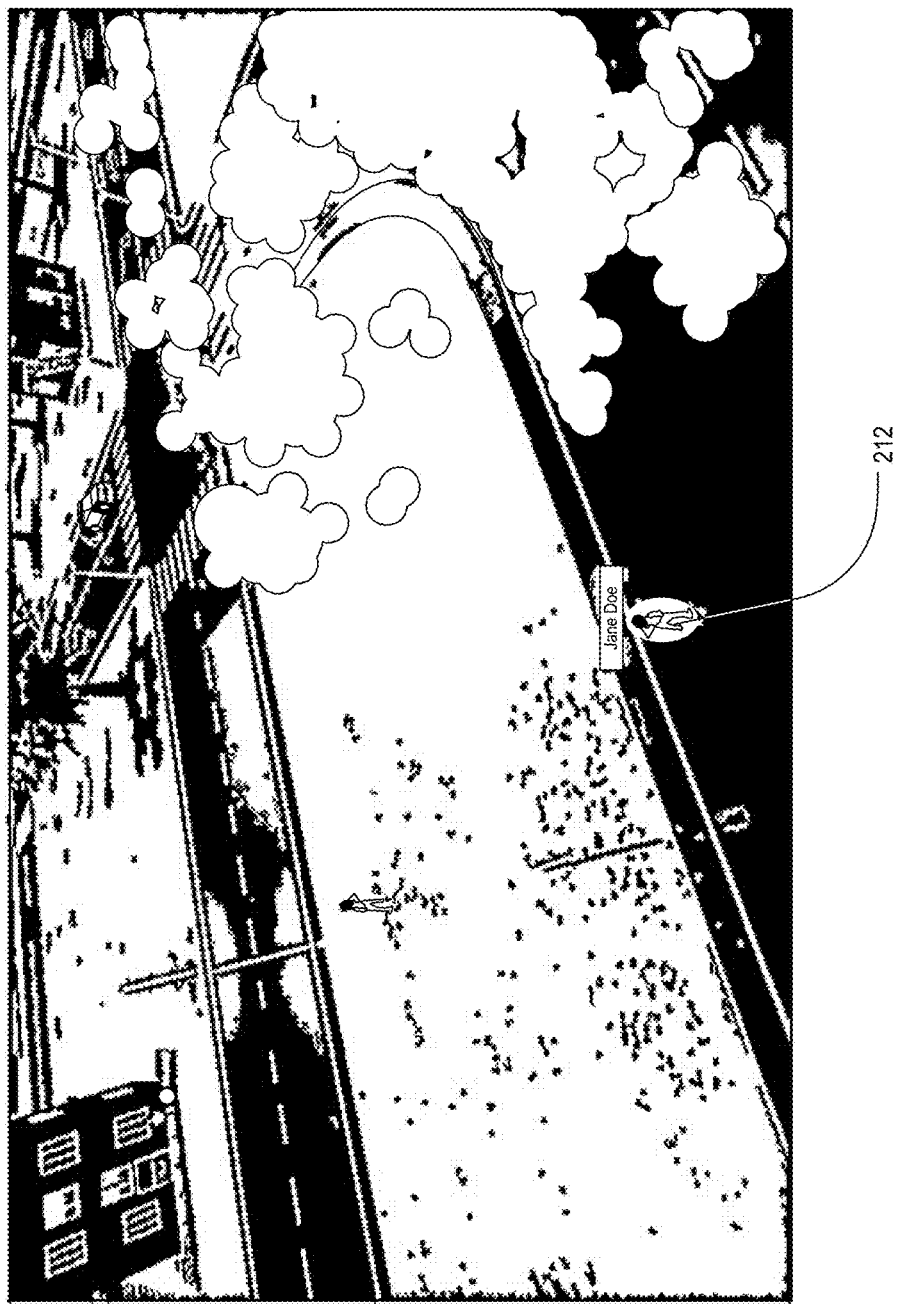
Figure 20:
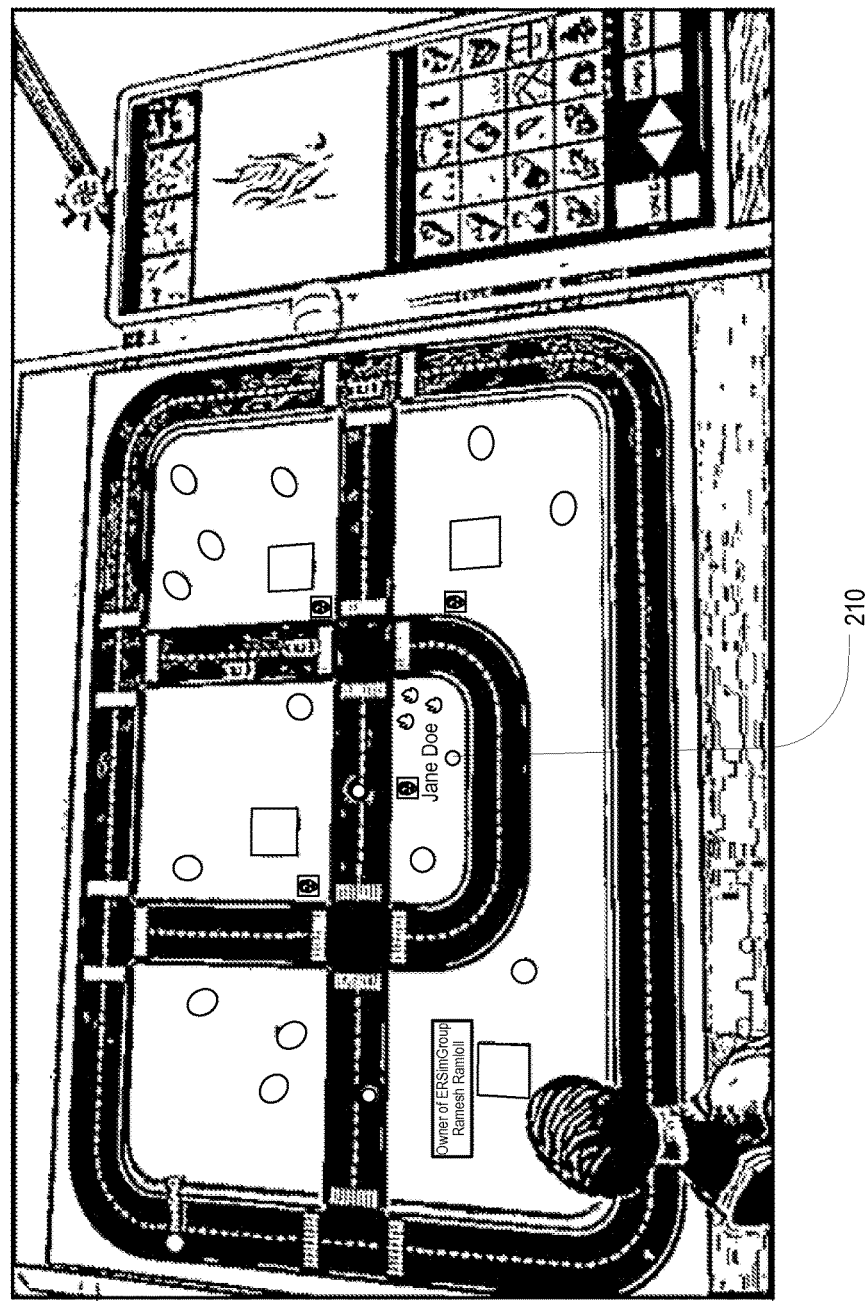

In a preferred methodology of use, instructors and/or students utilize the 2D virtual board 20 to build a virtual immersive 3D environment to practice one or more exercises of interest. FIG. 18 illustrates a student's avatar 12 and an instructor's avatar 212 positioned in front of a virtual board 20 which has been utilized to build an environment. The instructor's avatar 212 can then be navigated proximate the created items, as illustrated in FIG. 19. Preferably, the position of avatars is reflected on the virtual board 20 by a corresponding icon, as illustrated in FIG. 20, in which an icon 210 corresponding to the instructor's avatar 212 indicates the position of the instructor's avatar 212 in the virtual environment. The positions of avatars, just like other objects, are preferably continually updated to represent the current location of the avatars in the virtual environment. This is another example illustrating how the creation and control interface also provides a live map of the virtual environment.

Figure 21:
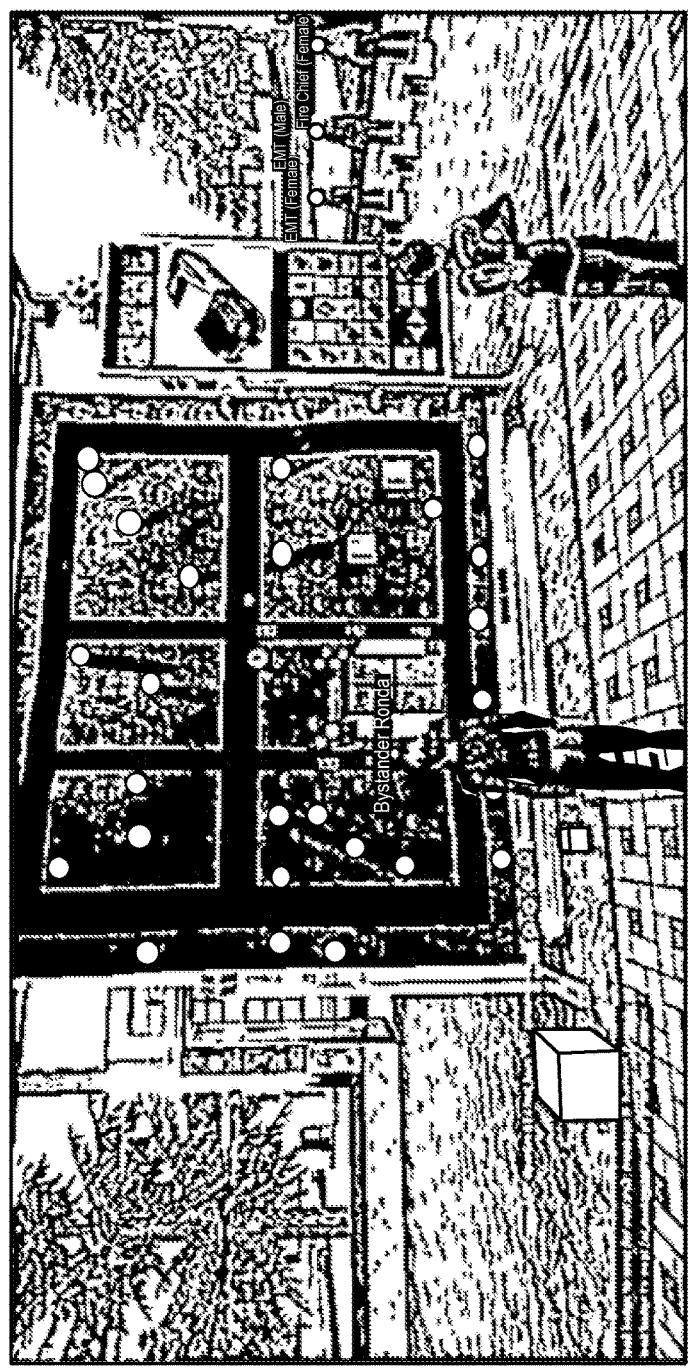
Figure 22:
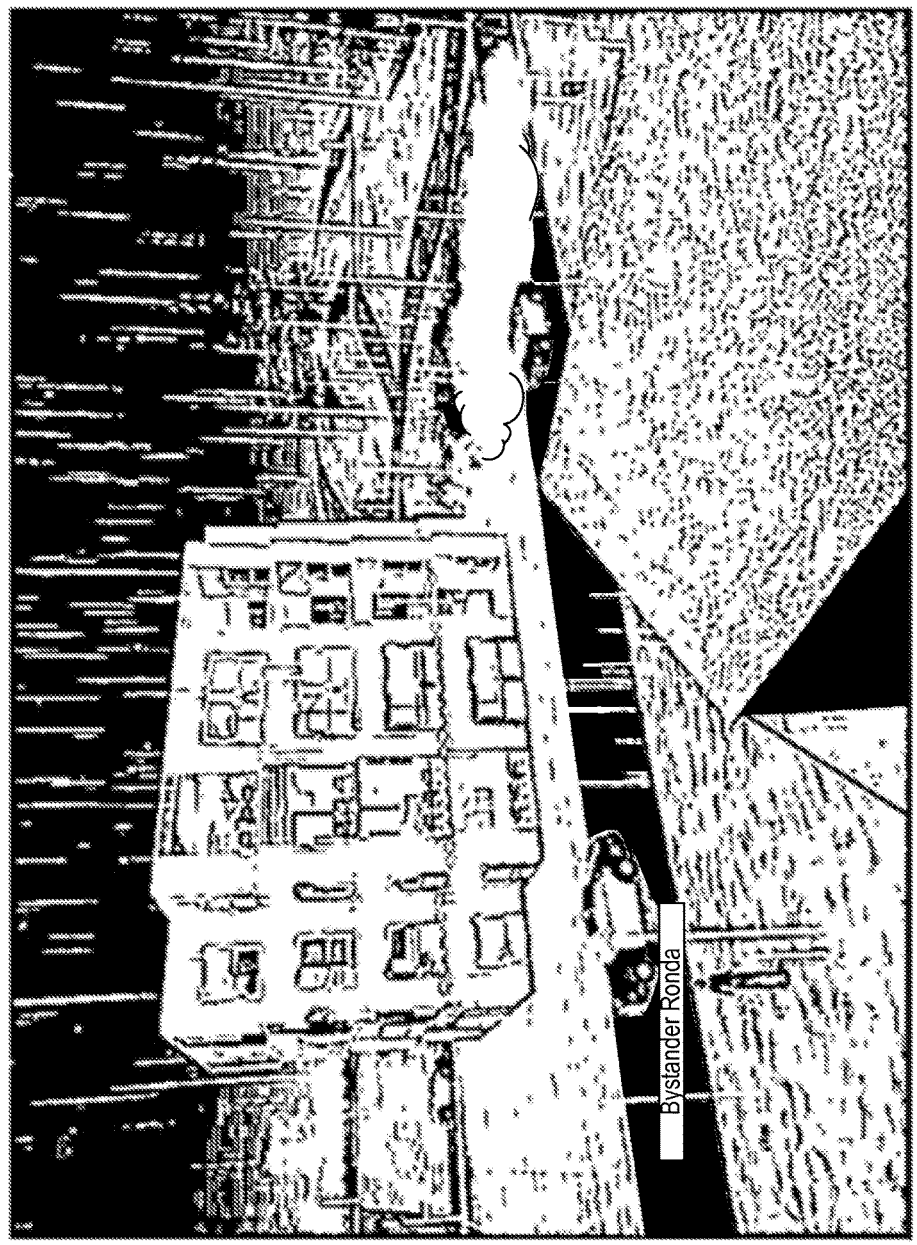

More complex environments involving more objects and elements can be similarly created, as illustrated in FIG. 21. Preferably, as in other examples, 3d elements appear immediately upon being created via the virtual board, and the behavior of all elements can be controlled via the board. Other elements or aspects of the virtual environment can be controlled via the virtual board as well. Preferably, weather, wind direction, time of day, etc. can be controlled via the virtual board, e.g. by clicking on relevant menu item icons disposed to the right. FIG. 22 illustrates the virtual environment after the virtual board has been utilized to create a night-time scenario with rain.

Figure 23:
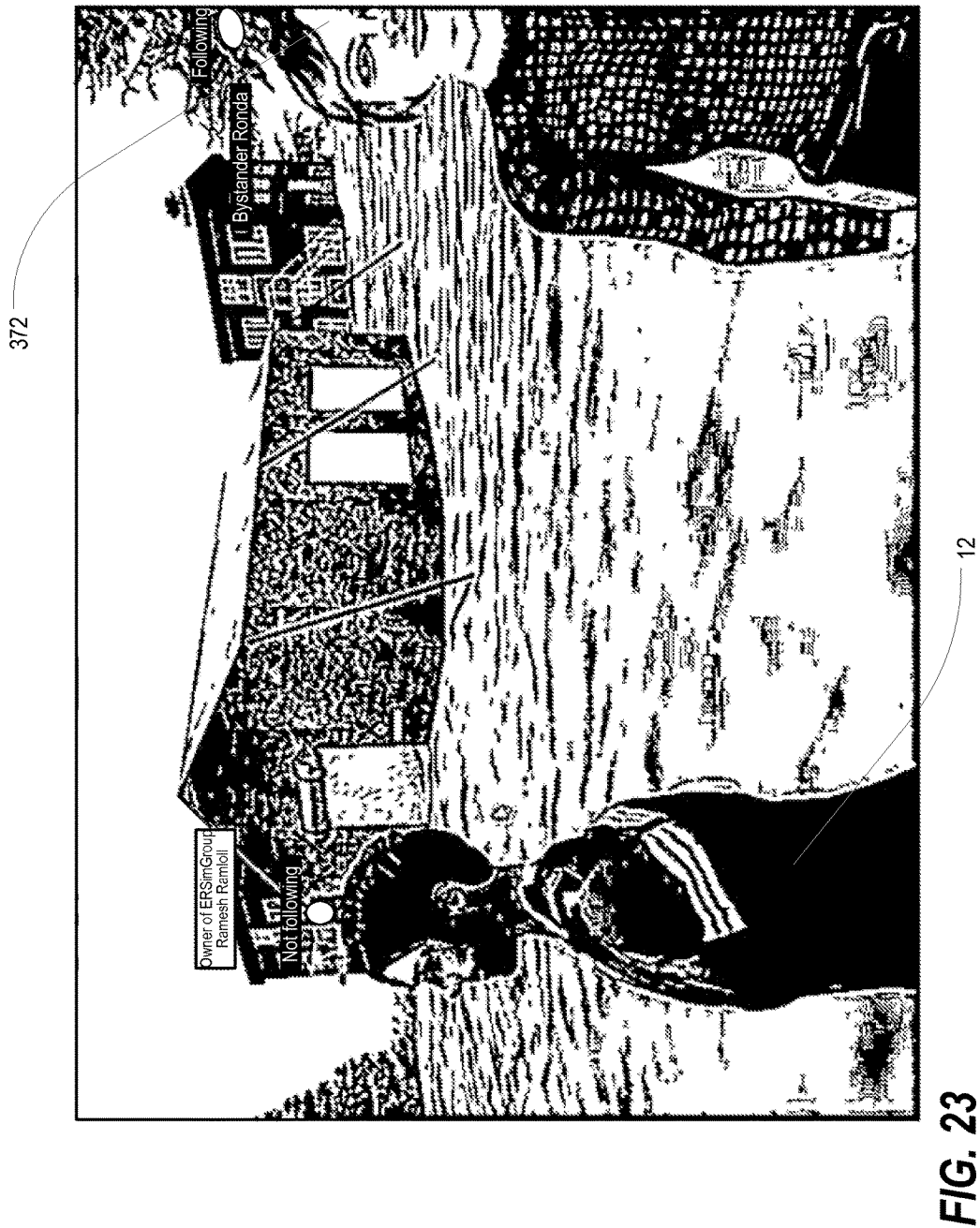
Figure 24:
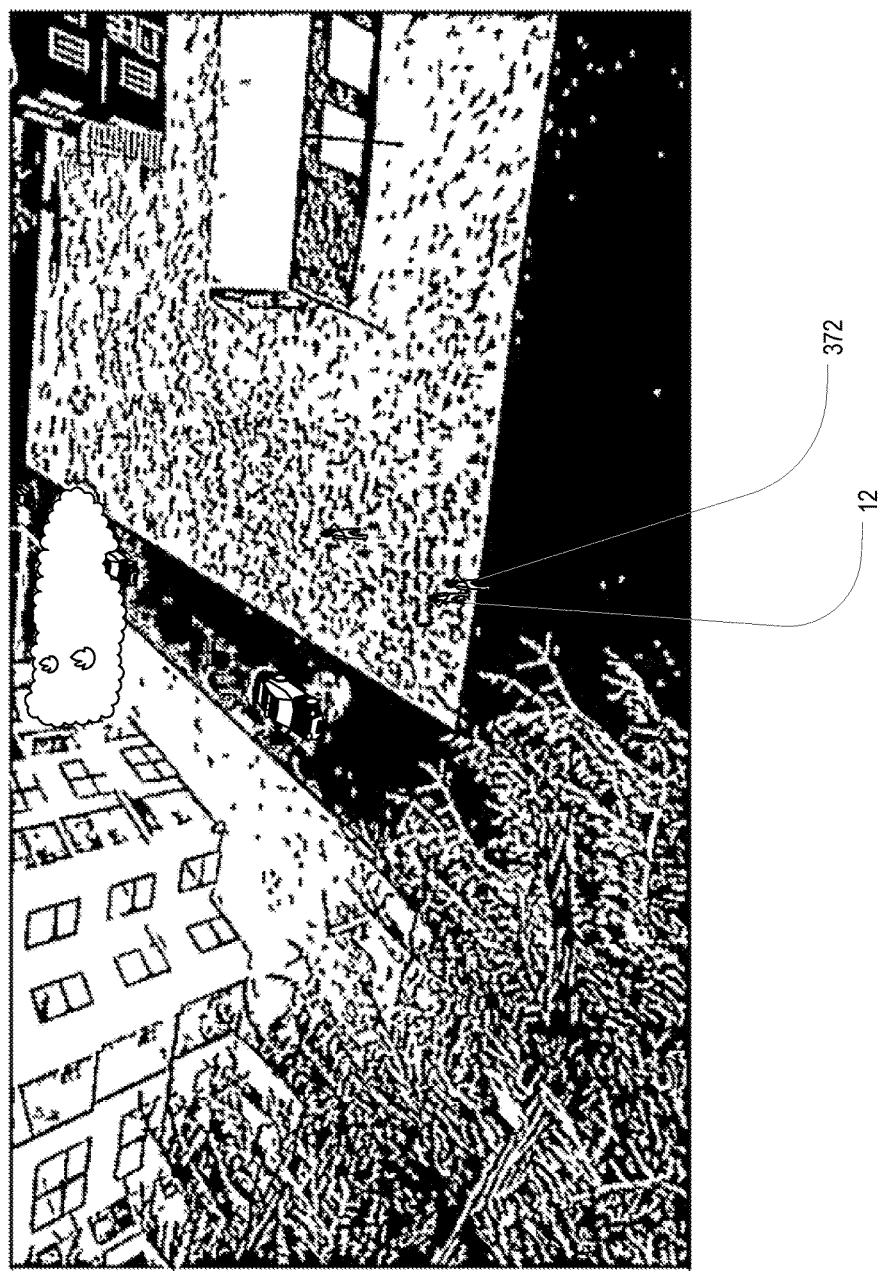

In preferred implementations, user avatars can interact with non-player characters. For example, a user may be able to instruct a non-player character to follow their avatar. FIG. 23 illustrates a non-player character 372 that is following a user's avatar 12, and FIG. 24 illustrates the same from another view.

Figure 25:
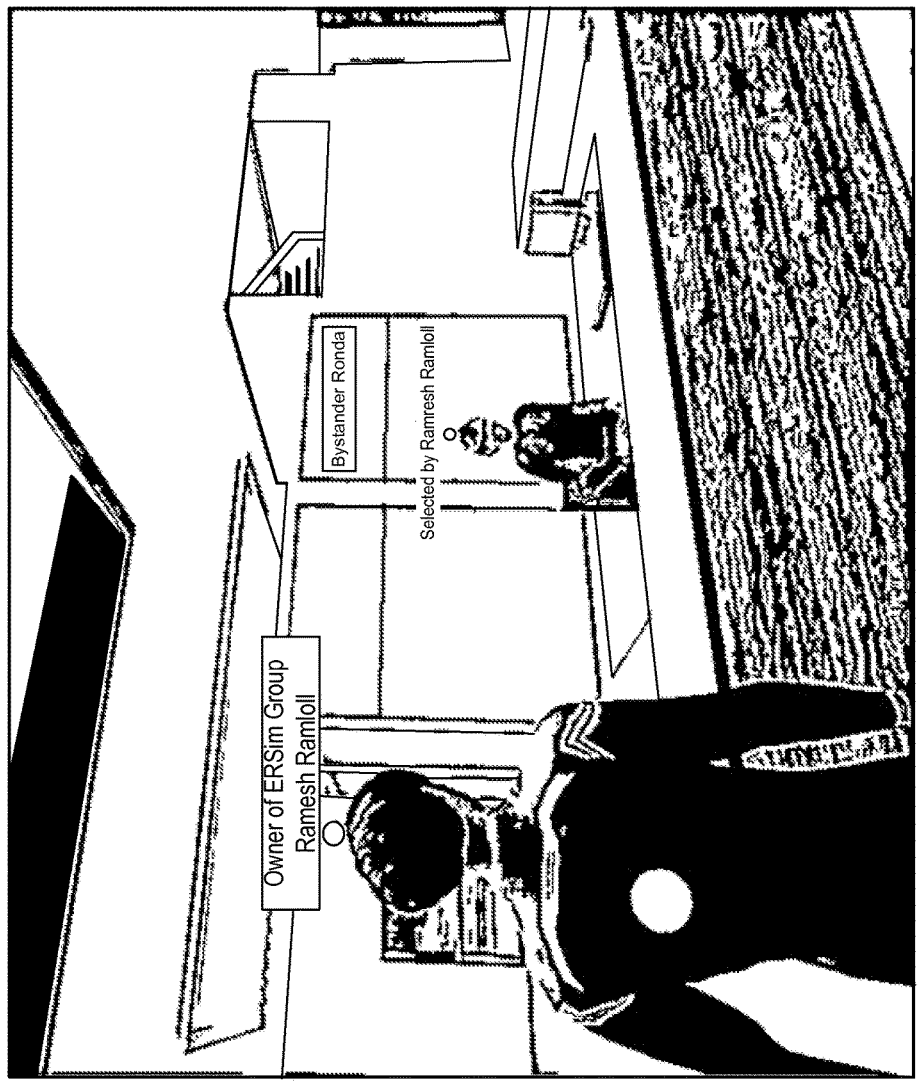

Preferably, both user avatars and non-player characters can additionally interact with objects in the virtual environment, which preferably behave the way they are supposed to. For example, both avatars and non-player characters can preferably interact with chairs and hospital beds so that they can sit or lay down and such interaction is preferably animated appropriately. FIG. 25 illustrates a non-player character sitting in a chair at a desk.

Figure 26:
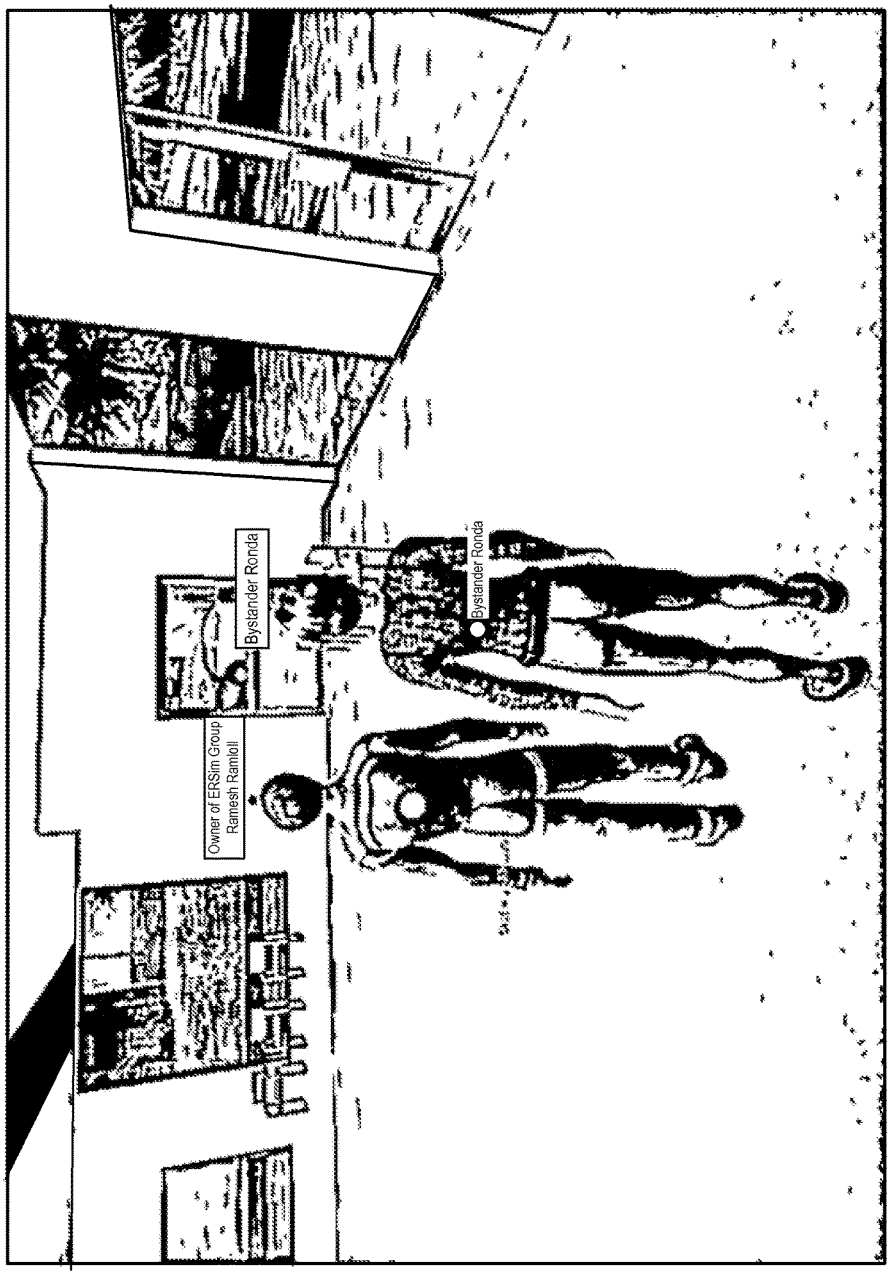

In a preferred implementation, all objects generated in a virtual environment are interactive. Preferably, avatars and non-player characters can interact with building doors, vehicle doors and any object of choice that has been pre-programmed to behave in a particular way. FIG. 26 illustrates exemplary such doors.

Figure 27:
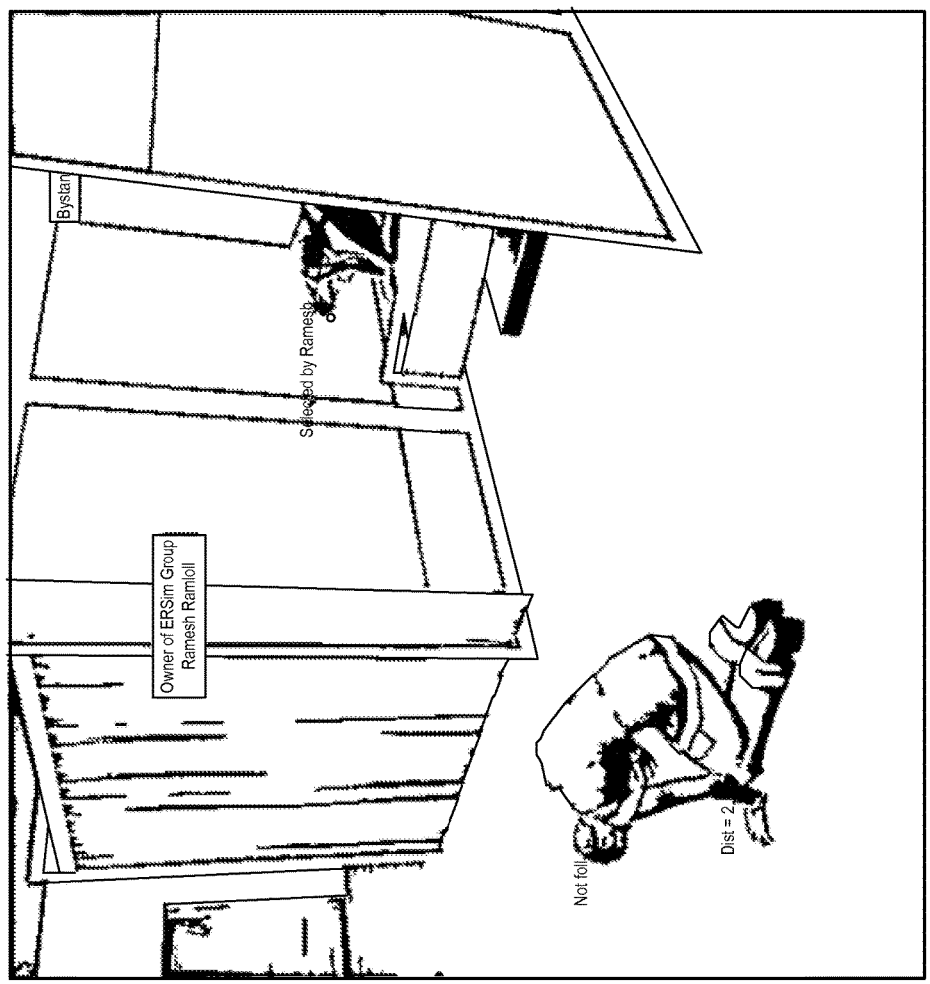

As described previously, non-player characters preferably respond to certain conditions, such as the presence of a gas leak source, automatically. In some preferred implementations, avatars may be configured to respond to certain conditions, such as environmental conditions, automatically as well, as illustrated in FIG. 27.

Figure 28:
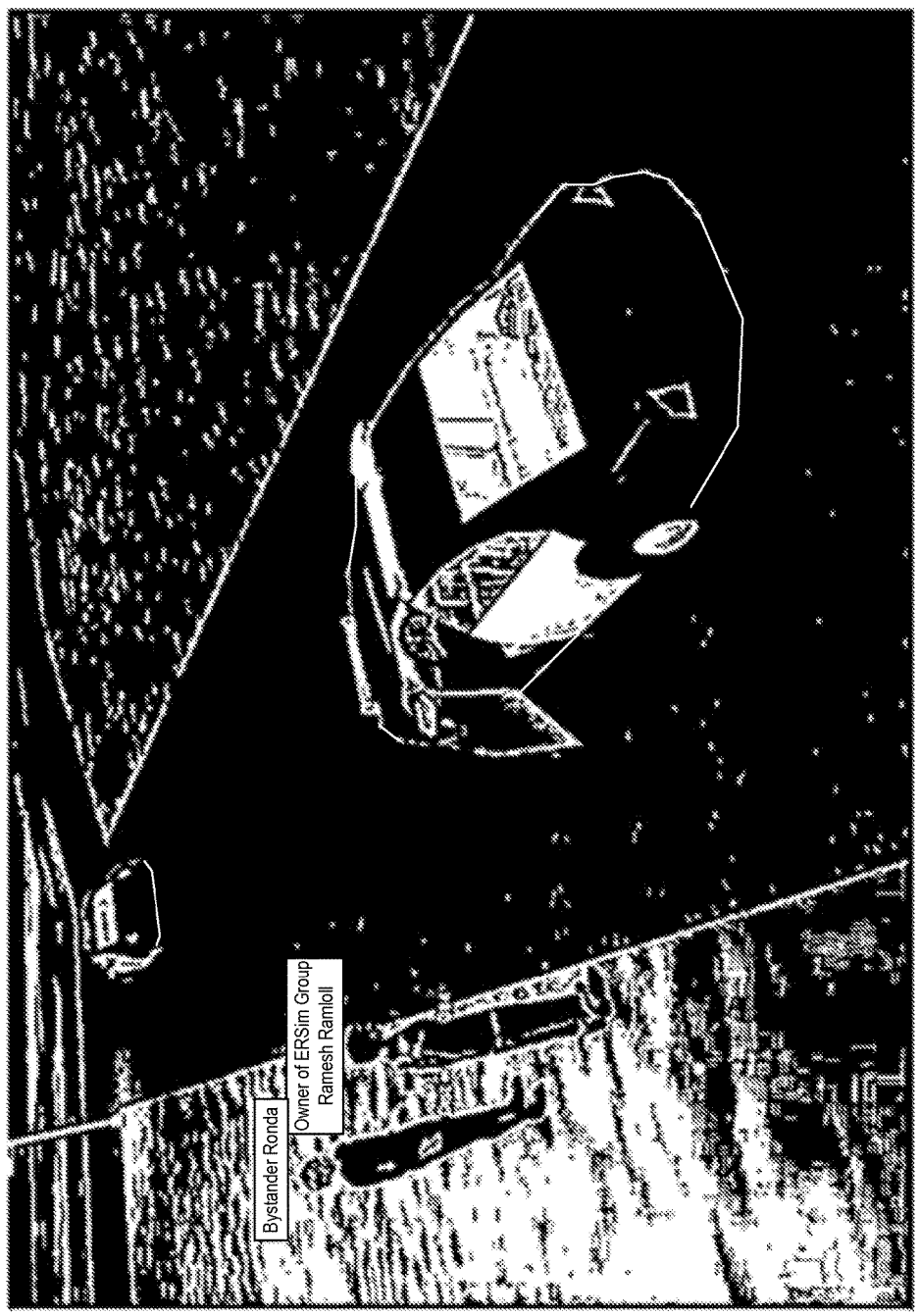
Figure 29:
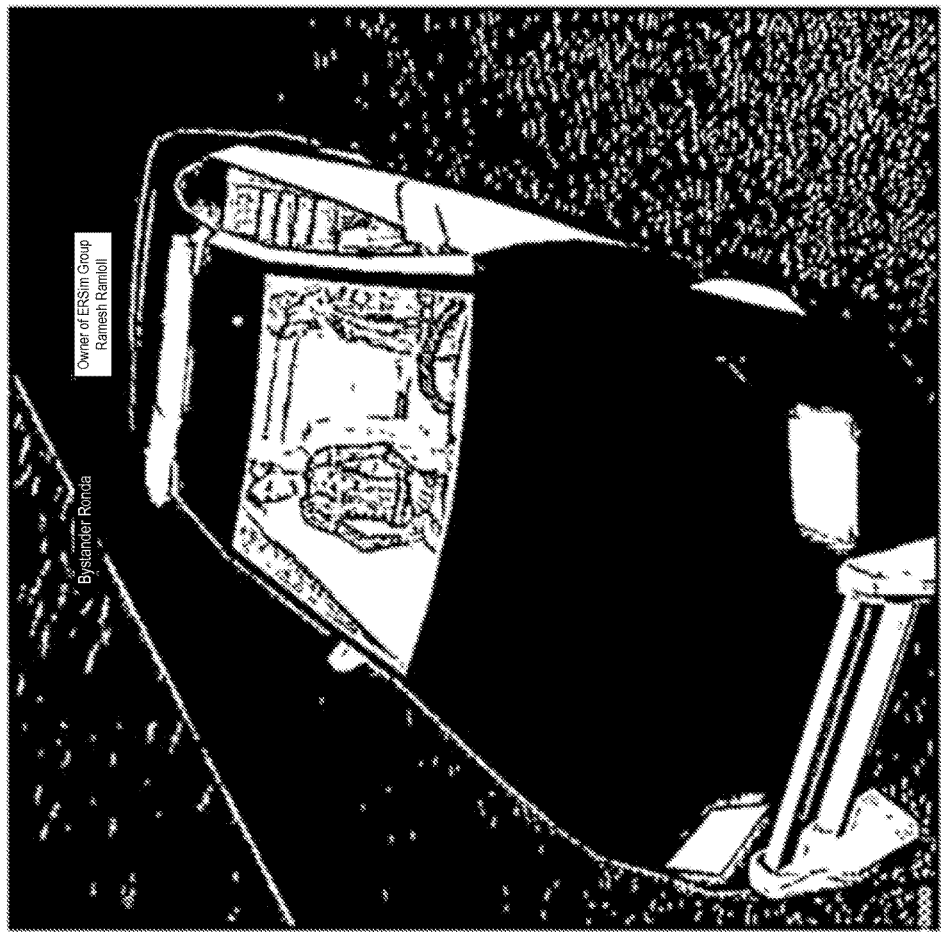
Figure 30:
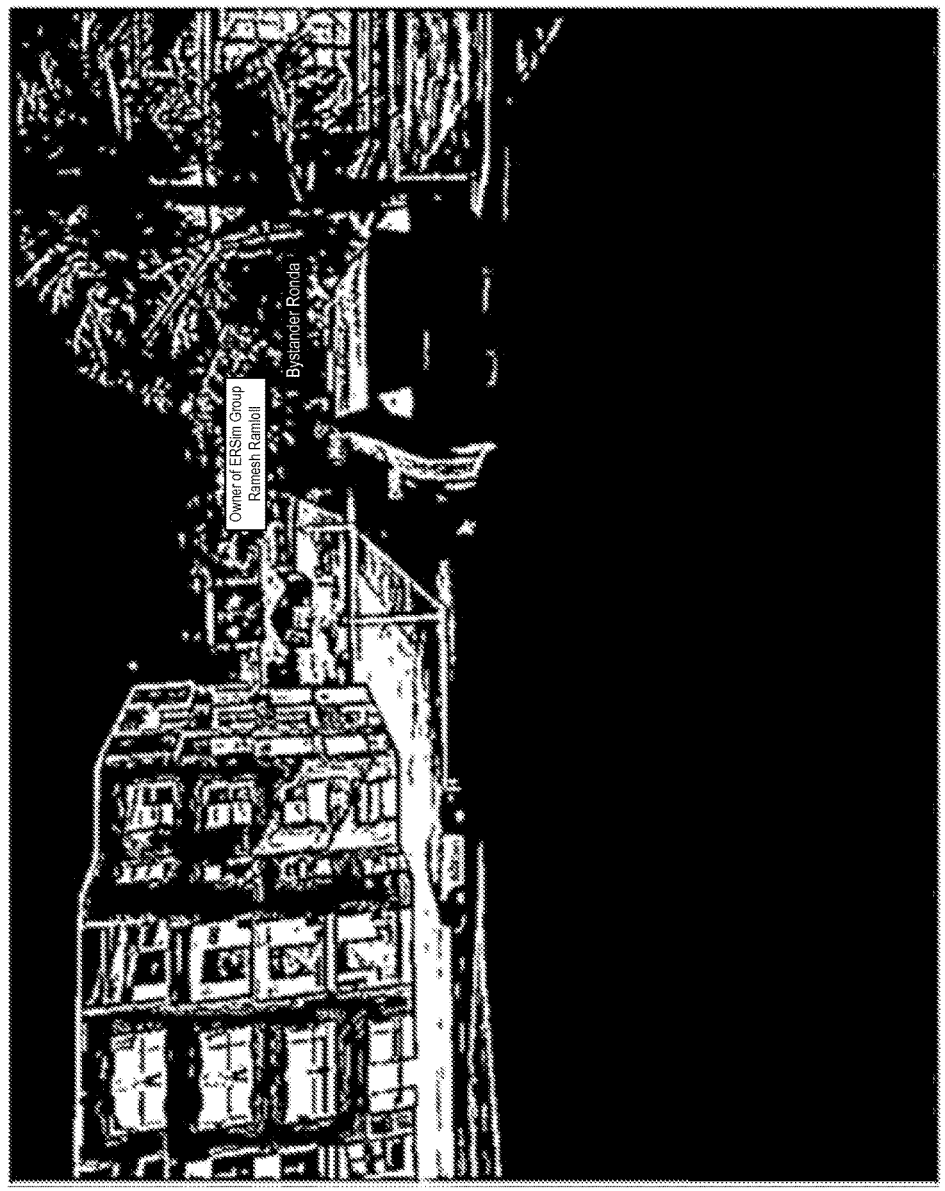
Figure 31:
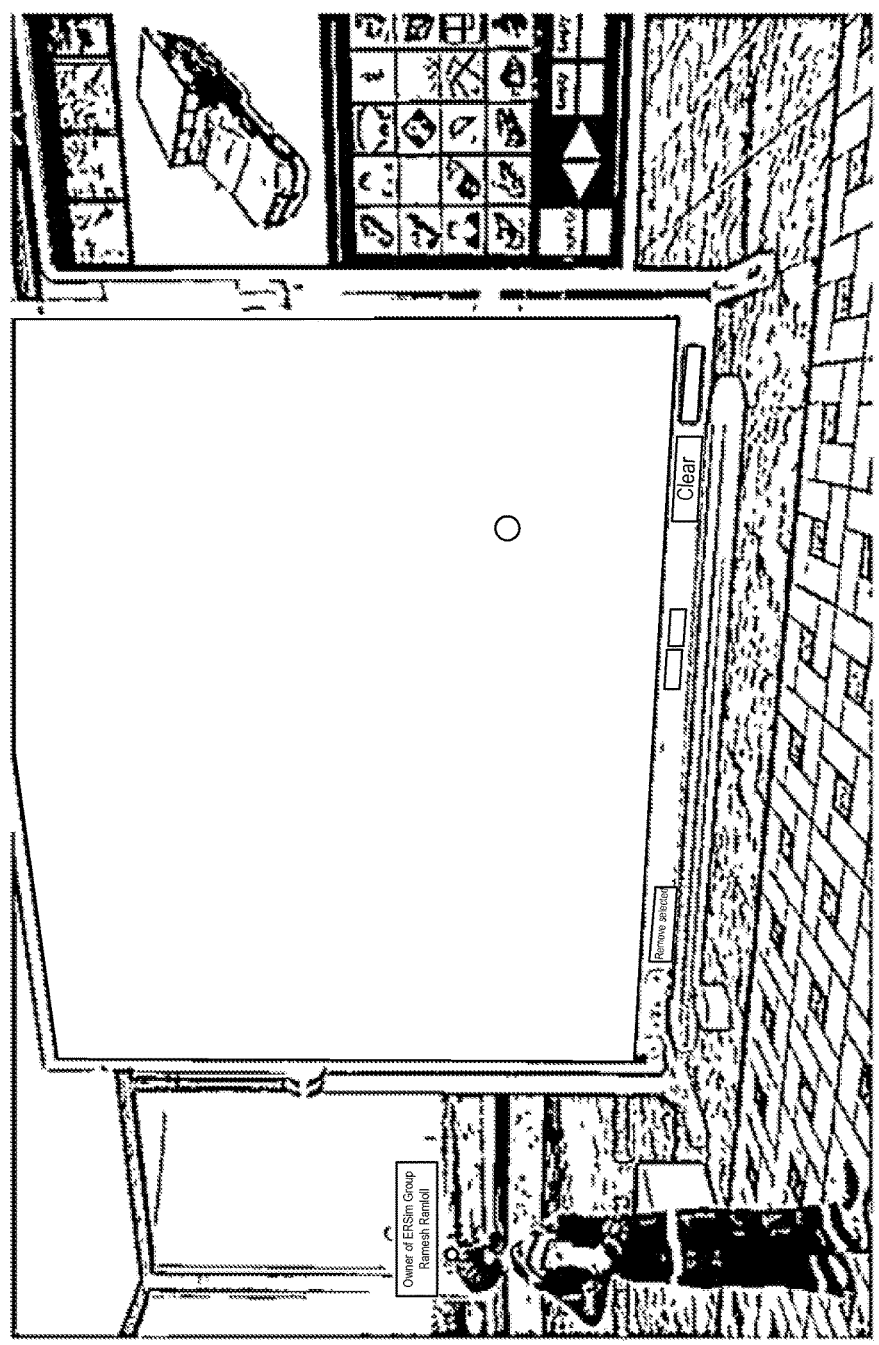

The virtual environment can include a range of interactive objects, including, for example, vehicles. FIG. 28 illustrates an exemplary such vehicle with its door open such that an avatar or non-player character may board. FIG. 29 illustrates the same vehicle with a user's avatar and a non-player character disposed inside. This vehicle obeys physical laws of the virtual environment, and can be driven around across the virtual environment. In one or more preferred implementations, non-player characters can drive vehicles as well. Such driving might be based on pre-programmed instructions, user instruction via the virtual board, or instruction from a user's avatar, or some combination thereof. In one or more preferred implementations, users can carry non-player characters in the vehicles they are driving. For example, a player can carry non-player patients in an ambulance.

In preferred implementations, instructors, or other users, can trigger events in a virtual environment, for example while students are participating in an exercise. Such events may be preconfigured events associated with one or more elements of the virtual environment, and may be preconfigured by a user, or may be part of an environment or the application itself.

In one or more preferred implementations, following conclusion of an exercise or scenario, a user may clear the entire scenario or exercise at a click, that is, may clear the virtual environment, thereby clearing the way for another environment to be loaded from a file, or re-created from scratch.

Figure 32:
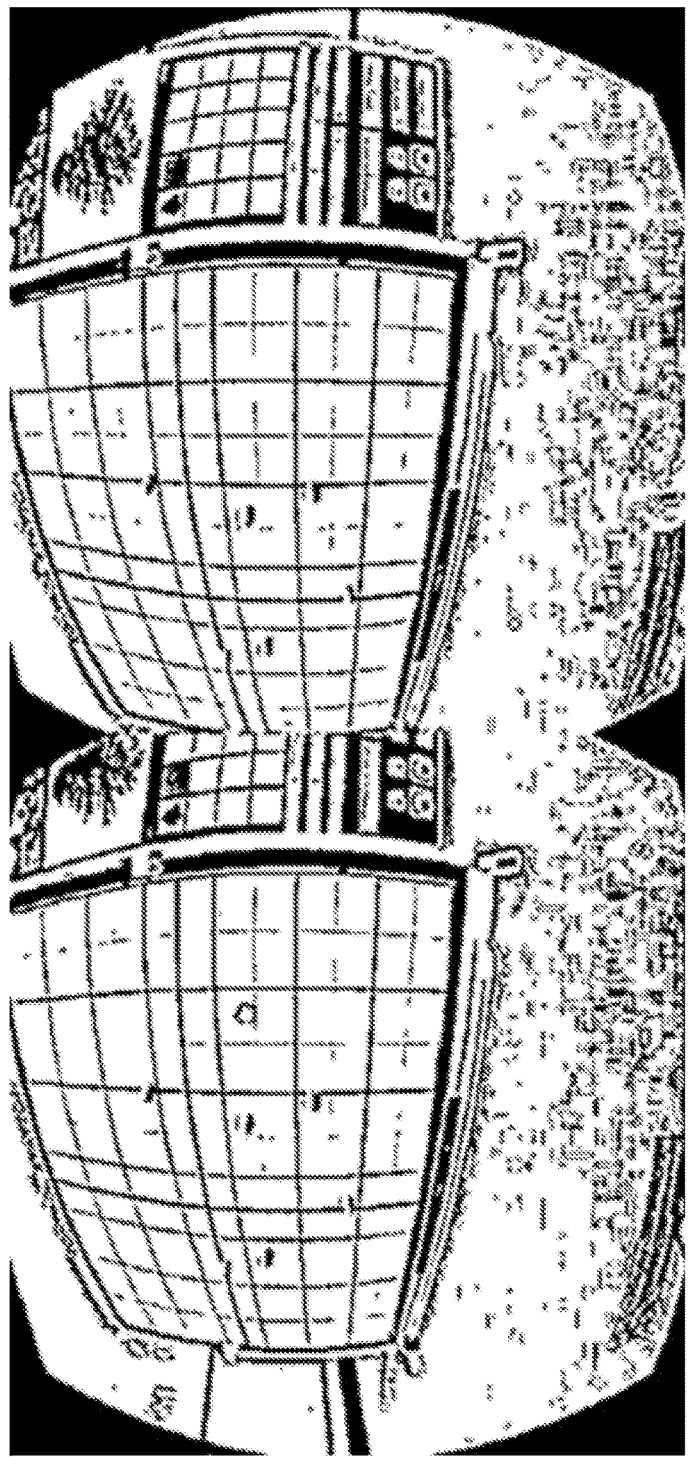
FIG. 32 illustrates a view of a virtual control board modified for display on a head mounted display.

As noted above, one or more preferred implementations can be used directly through a touch screen or mouse based desktop interface, or can be accessed in a 360 virtual reality immersive environment accessed through a head mounted display such as the Oculus Rift virtual reality headset. FIG. 32 illustrates a view of a virtual control board modified for display on such a head mounted display. Preferably, a user is able to see the virtual control as an object within a three hundred and sixty degree fully immersive virtual environment.

Figure 33:
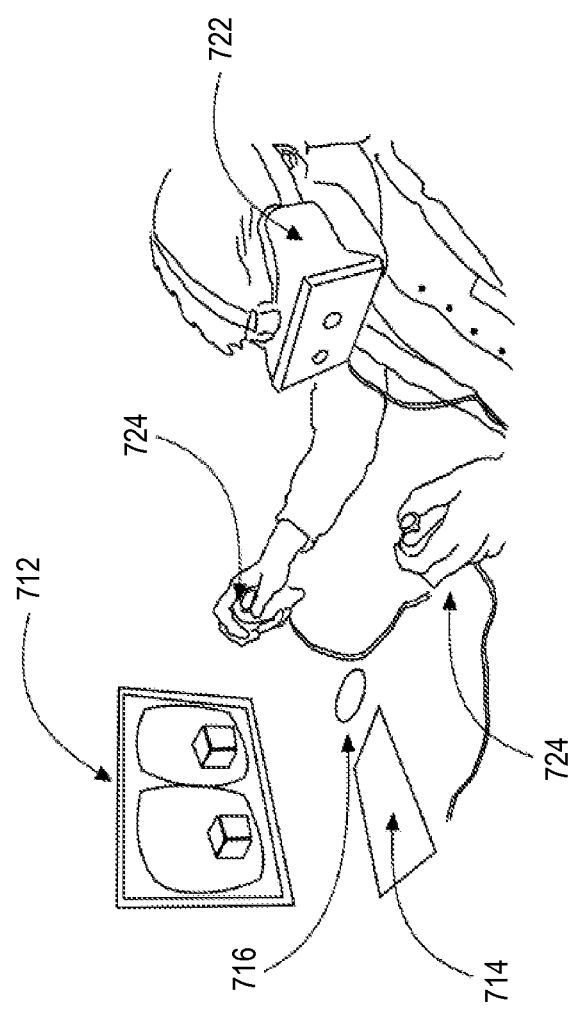
FIG. 33 illustrates an exemplary system in accordance with one or more preferred implementations.

In one or more preferred implementations, while totally immersed in a virtual reality environment, users can interact with a virtual control board in the environment using input devices such as the Razer Hydra™ as illustrated in FIG. 33 to interact with objects on the board, or to introduce new objects from the browsable library of preprogrammed objects. With this set up, users preferably do not need to exit the total immersive environment in order to make desired virtual content modifications. This can be contrasted with a methodology where interactions might be performed using a keyboard or board while not being immersed. In one or more preferred implementations, a system might be configured to use various input and output devices. For example a system might be configured to output to a computer screen 712, or to a head mounted display 722, and might be configured to receive input from a keyboard 714 and mouse 716, or from one or more handheld input devices 724, such as a Razer Hydra, as illustrated in FIG. 33.

Figure 34:
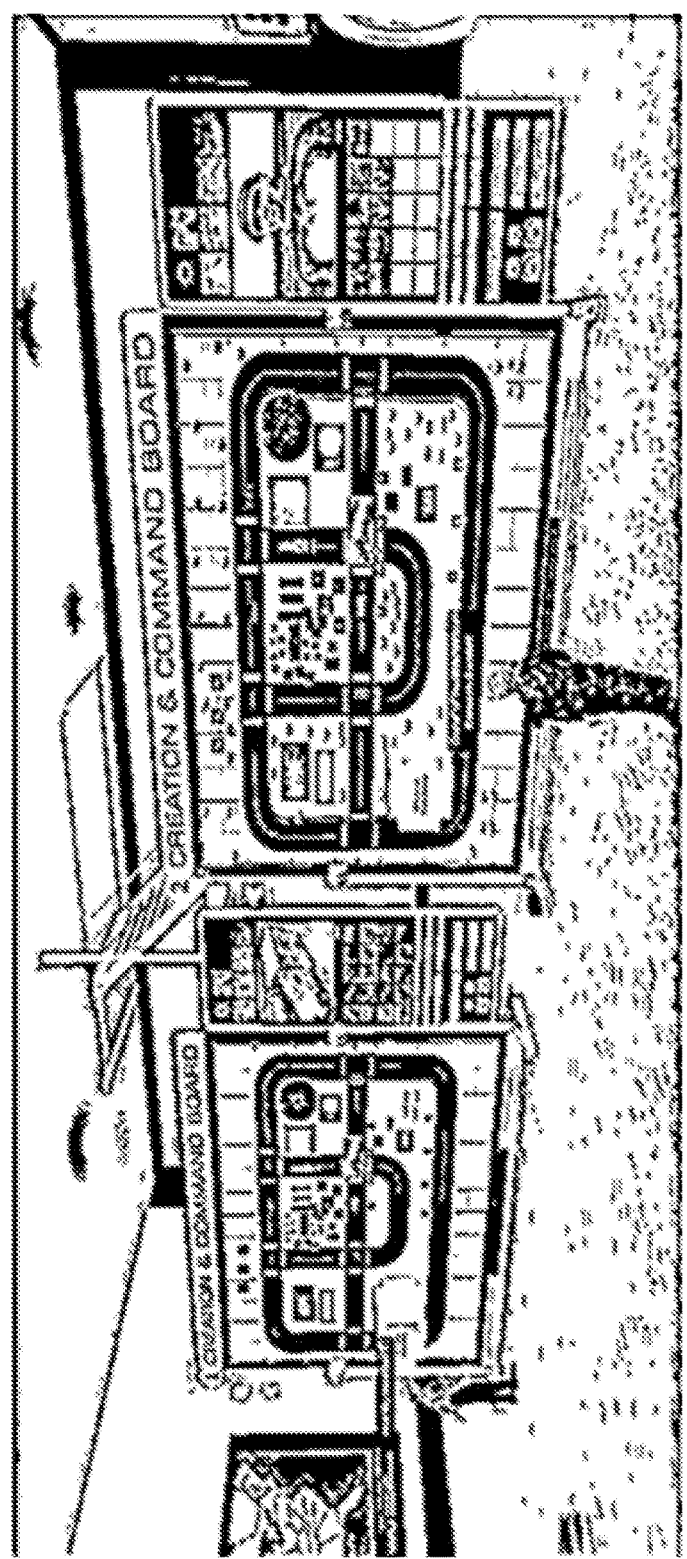
FIG. 34 illustrates an exemplary virtual environment including multiple control boards operating at the same time.

In one or more preferred implementations, multiple virtual control boards are utilized in a single virtual environment. FIG. 34 illustrates an exemplary virtual environment including multiple control boards operating at the same time, each control board showing specific control points and specific data from the environment. Preferably, multiple virtual control boards can be physically located anywhere in a virtual environment and are synced with each other (i.e. changes in or at one virtual control board will be reflected meaningfully in other virtual control boards). In one or more preferred methodologies of use, the use of multiple virtual control boards enables separation of duties for multiple users controlling content and their behaviors in complex virtual reality training scenarios.

In one or more preferred implementations, one or more virtual environments are utilized which each can be characterized as a region which is cloud hosted. In one or more preferred implementations, regions are hosted on a cloud hosting site, such as Kitely™ Preferably, regions can be duplicated as many times as necessary in order to accommodate a number of users (e.g. a class including users who are to participate in one or more training scenarios). In one or more preferred implementations, software provides the capability for instructors to easily create breakout sessions, and different groups of users can participate in scenarios on dedicated regions. Preferably, the pressure on resources gets distributed evenly among regions running as different instances on a cloud, e.g. the Amazon EC2 cloud.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method for training a plurality of students in an interactive training scenario utilizing an interactive virtual environment, the method comprising:
  (a) loading, at one or more server computing devices forming part of a computing cloud, a three-dimensional interactive virtual environment;
  (b) communicating, from the one or more server computing devices to a first computing device associated with an instructor, data corresponding to the interactive virtual environment;
  (c) effecting display, at a display device associated with the first computing device, of the interactive virtual environment based on the data corresponding to the interactive virtual environment communicated to the first computing device, the interactive virtual environment including
(i) a plurality of elements, and
(ii) a virtual control board disposed within the interactive virtual environment, the virtual control board including a two-dimensional surface map comprising a plurality of icons corresponding to one or more of the plurality of elements of the interactive virtual environment, wherein
    (A) the virtual control board is configured to allow a virtual user of the virtual control board to modify existing elements of the interactive virtual environment, wherein the virtual user is an avatar representative of a user,
    (B) the virtual control board is configured to allow a virtual user of the virtual control board to create new elements in the interactive virtual environment,
    (C) the surface map comprising the plurality of icons is continuously updated to reflect:
        (I) status changes of elements of the interactive virtual environment, including status changes based on user modification via the virtual control board, and
        (II) new elements created via the virtual control board;
(d) receiving, at the first computing device from the instructor via one or more input devices associated with the first computing device, first input corresponding to interaction with the virtual control board that represents creation of a plurality of new elements for the interactive virtual environment;
(e) communicating, from the first computing device to the one or more server computing devices, data representing the first input corresponding to interaction with the virtual control board;
(f) effecting display, at the display device associated with the first computing device, of the interactive virtual environment including the virtual control board updated such that the virtual control board includes new icons corresponding to the new elements in the interactive virtual environment created based on the interaction with the virtual control board;
(g) communicating, from the one or more server computing devices to a second computing device associated with a first student, data corresponding to the interactive virtual environment;
(h) effecting display, at a display device associated with the second computing device, of the interactive virtual environment based on the data corresponding to the interactive virtual environment communicated to the second computing device;
(i) communicating, from the one or more server computing devices to a third computing device associated with a second student, data corresponding to the interactive virtual environment;
(j) effecting display, at a display device associated with the third computing device, of the interactive virtual environment based on the data corresponding to the interactive virtual environment communicated to the third computing device;
(k) receiving, at the second computing device from the first student via one or more input devices associated with the second computing device, second input corresponding to interaction with a first element of the interactive virtual environment;
(l) communicating, from the second computing device to the one or more server computing devices, data representing the second input corresponding to interaction with the first element;
(m) communicating, from the one or more server computing devices to the third computing device associated with the second student, data corresponding to an update of the interactive virtual environment which includes an update to the first element based on the first student's interaction with the first element;
(n) effecting display, at a display device associated with the third computing device, of the interactive virtual environment updated based on the data corresponding to the interactive virtual environment communicated to the third computing device which includes an update to the first element;
(o) communicating, from the one or more server computing devices to the first computing device associated with the instructor, data corresponding to an update of the interactive virtual environment which includes an update to the first element based on the first student's interaction with the first element;
(p) effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element;
(q) receiving, at the first computing device from the instructor via one or more input devices associated with the first computing device, third input corresponding to interaction with the virtual control board that represents modification of an existing second element of the interactive virtual environment;
(r) communicating, from the first computing device to the one or more server computing devices, data representing the third input corresponding to interaction with the virtual control board;
(s) effecting display, at a display device associated with the first computing device, of the interactive virtual environment updated based on the interaction with the virtual control board, the updated interactive virtual environment including an updated second element and an updated icon of the interactive virtual control board corresponding to the second element;
(t) communicating, from the one or more server computing devices to the second computing device associated with the first student, data corresponding to an update of the interactive virtual environment which includes an update to the second element based on the instructor's interaction with the virtual control board;
(q) effecting display, at the display device associated with the second computing device, of the interactive virtual environment including the virtual control board updated to reflect the modification of the existing second element of the interactive virtual environment based on the interaction with the virtual control board;
(u) communicating, from the one or more server computing devices to the third computing device associated with the second student, data corresponding to an update of the interactive virtual environment which includes an update to the second element based on the instructor's interaction with the virtual control board;

(v) effecting display, at the display device associated with the third computing device, of the interactive virtual environment including the virtual control board updated to reflect the modification of the existing second element of the interactive virtual environment based on the interaction with the virtual control board;
(w) wherein
  (i) the instructor is an instructor for an interactive training scenario for the first and second students,
  (ii) the created plurality of new elements for the interactive virtual environment are created for the interactive training scenario,
  (iii) the interaction with the first element is part of the interactive training scenario, and
  (iv) the modification of the existing second element is performed for the interactive training scenario.

2. The method of claim 1, wherein one or more of the created plurality of elements is an inanimate object.

3. The method of claim 1, wherein one or more of the created plurality of elements is an animated object controlled by an algorithm.

4. The method of claim 1, wherein one or more of the created plurality of elements is a non-player character.

5. The method of claim 1, wherein the display device associated with the first computing device comprises a head mounted display.

6. The method of claim 1, wherein the display device associated with the second computing device comprises a virtual reality headset.

7. The method of claim 1, wherein the display device associated with the third computing device displays an immersive 3d environment.

8. The method of claim 1, wherein the display device associated with the first computing device comprises a monitor.

9. The method of claim 1, wherein the first element is a door, and wherein the interaction with the first element comprises opening the door.

10. One or more computer readable media containing computer executable instructions for performing the method of claim 1.

11. A method comprising:
(a) loading, at one or more server computing devices forming part of a computing cloud, a three-dimensional interactive virtual environment;
(b) communicating, from the one or more server computing devices to a first computing device associated with a first user, data corresponding to the interactive virtual environment;
(c) effecting display, at a display device associated with the first computing device, of the interactive virtual environment based on the data corresponding to the interactive virtual environment communicated to the first computing device, the interactive virtual environment including
  (i) a plurality of elements, and
  (ii) a virtual control board disposed within the interactive virtual environment, the virtual control board including a two-dimensional surface map comprising a plurality of icons corresponding to one or more of the plurality of elements of the interactive virtual environment, wherein
    (A) the virtual control board is configured to allow a virtual user of the virtual control board to modify existing elements of the interactive virtual environment, wherein the virtual user is an avatar representative of a user,
    (B) the virtual control board is configured to allow a virtual user of the virtual control board to create new elements in the interactive virtual environment,
    (C) the surface map comprising the plurality of icons is continuously updated to reflect
      (I) status changes of elements of the interactive virtual environment, including status changes based on user modification via the virtual control board, and
      (II) new elements created via the virtual control board;
(d) receiving, at the first computing device from the first user via one or more input devices associated with the first computing device, first input corresponding to interaction with the virtual control board that represents creation of a plurality of new elements for the interactive virtual environment;
(e) communicating, from the first computing device to the one or more server computing devices, data representing the first input corresponding to interaction with the virtual control board;
(f) effecting display, at the display device associated with the first computing device, of the interactive virtual environment including the virtual control board updated such that the virtual control board includes new icons corresponding to the new elements in the interactive virtual environment created based on the interaction with the virtual control board;
(g) communicating, from the one or more server computing devices to a second computing device associated with a second user, data corresponding to the interactive virtual environment;
(h) effecting display, at a display device associated with the second computing device, of the interactive virtual environment based on the data corresponding to the interactive virtual environment communicated to the second computing device;
(i) communicating, from the one or more server computing devices to a third computing device associated with a third user, data corresponding to the interactive virtual environment;
(j) effecting display, at a display device associated with the third computing device, of the interactive virtual environment based on the data corresponding to the interactive virtual environment communicated to the third computing device;
(k) receiving, at the second computing device from the second user via one or more input devices associated with the second computing device, second input corresponding to interaction with a first element of the interactive virtual environment;
(l) communicating, from the second computing device to the one or more server computing devices, data representing the second input corresponding to interaction with the first element;
(m) communicating, from the one or more server computing devices to the third computing device associated with the third user, data corresponding to an update of the interactive virtual environment which includes an update to the first element based on the second user's interaction with the first element;
(n) effecting display, at a display device associated with the third computing device, of the interactive virtual environment updated based on the data corresponding to the interactive virtual environment communicated to the third computing device which includes an update to the first element;

(o) communicating, from the one or more server computing devices to the first computing device associated with the first user, data corresponding to an update of the interactive virtual environment which includes an update to the first element based on the second user's interaction with the first element;

(p) effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element;

(q) receiving, at the first computing device from the first user via one or more input devices associated with the first computing device, third input corresponding to interaction with the virtual control board that represents modification of an existing second element of the interactive virtual environment;

(r) communicating, from the first computing device to the one or more server computing devices, data representing the third input corresponding to interaction with the virtual control board;

(s) effecting display, at a display device associated with the first computing device, of the interactive virtual environment updated based on the interaction with the virtual control board, the updated interactive virtual environment including an updated second element and an updated icon of the interactive virtual control board corresponding to the second element;

(t) communicating, from the one or more server computing devices to the second computing device associated with the second user, data corresponding to an update of the interactive virtual environment which includes an update to the second element based on the first user's interaction with the virtual control board;

(q) effecting display, at the display device associated with the second computing device, of the interactive virtual environment including the virtual control board updated to reflect the modification of the existing second element of the interactive virtual environment based on the interaction with the virtual control board;

(u) communicating, from the one or more server computing devices to the third computing device associated with the third user, data corresponding to an update of the interactive virtual environment which includes an update to the second element based on the first user's interaction with the virtual control board; and (v) effecting display, at the display device associated with the third computing device, of the interactive virtual environment including the virtual control board updated to reflect the modification of the existing second element of the interactive virtual environment based on the interaction with the virtual control board.

12. The method of claim 11, wherein one or more of the created plurality of elements is an inanimate object.

13. The method of claim 11, wherein one or more of the created plurality of elements is an animated object controlled by an algorithm.

14. The method of claim 11, wherein one or more of the created plurality of elements is a non-player character.

15. The method of claim 11, wherein the display device associated with the first computing device comprises a head mounted display.

16. The method of claim 11, wherein the display device associated with the second computing device comprises a virtual reality headset.

17. The method of claim 11, wherein the first element is a door, and wherein the interaction with the first element comprises opening the door.

18. One or more computer readable media containing computer executable instructions for performing the method of claim 11.

19. A method comprising:

(a) loading, at one or more server computing devices forming part of a computing cloud, a three-dimensional interactive virtual environment;

(b) communicating, from the one or more server computing devices to a first computing device associated with a first user, data corresponding to the interactive virtual environment;

(c) effecting display, at a display device associated with the first computing device, of the interactive virtual environment based on the data corresponding to the interactive virtual environment communicated to the first computing device, the interactive virtual environment including (i) a plurality of elements, and (ii) a virtual control board disposed within the interactive virtual environment, the virtual control board including a two-dimensional surface map comprising a plurality of icons corresponding to one or more of the plurality of elements of the interactive virtual environment, wherein (A) the virtual control board is configured to allow a virtual user of the virtual control board to modify existing elements of the interactive virtual environment, wherein the virtual user is an avatar representative of a user, (B) the virtual control board is configured to allow a virtual user of the virtual control board to create new elements in the interactive virtual environment, (C) the surface map comprising the plurality of icons is continuously updated to reflect (I) status changes of elements of the interactive virtual environment, including status changes based on user modification via the virtual control board, and (II) new elements created via the virtual control board;

(d) receiving, at the first computing device from the first user via one or more input devices associated with the first computing device, first input corresponding to interaction with the virtual control board that represents creation of a plurality of new elements for the interactive virtual environment;

(e) communicating, from the first computing device to the one or more server computing devices, data representing the first input corresponding to interaction with the virtual control board;

(f) effecting display, at the display device associated with the first computing device, of the interactive virtual environment including the virtual control board updated such that the virtual control board includes new icons corresponding to the new elements in the interactive virtual environment created based on the interaction with the virtual control board;

(g) communicating, from the one or more server computing devices to a second computing device associated with a second user, data corresponding to the interactive virtual environment;

(h) effecting display, at a display device associated with the second computing device, of the interactive virtual environment based on the data corresponding to the interactive virtual environment communicated to the second computing device;

(i) receiving, at the second computing device from the second user via one or more input devices associated with the second computing device, second input corresponding to interaction with a first element of the interactive virtual environment;

(j) communicating, from the second computing device to the one or more server computing devices, data representing the second input corresponding to interaction with the first element;

(k) communicating, from the one or more server computing devices to the first computing device associated with the first user, data corresponding to an update of the interactive virtual environment which includes an update to the first element based on the second user's interaction with the first element;

(l) effecting display, at a display device associated with the first computing device, of the interactive virtual environment updated based on the data corresponding to the interactive virtual environment communicated to the first computing device which includes an update to the first element, the updated interactive virtual environment including an updated first element and an updated icon of the interactive virtual control board corresponding to the first element;

(m) receiving, at the first computing device from the first user via one or more input devices associated with the first computing device, third input corresponding to interaction with the virtual control board that represents modification of an existing second element of the interactive virtual environment;

(n) communicating, from the first computing device to the one or more server computing devices, data representing the third input corresponding to interaction with the virtual control board;

(o) effecting display, at a display device associated with the first computing device, of the interactive virtual environment updated based on the interaction with the virtual control board, the updated interactive virtual environment including an updated second element and an updated icon of the interactive virtual control board corresponding to the second element;

(p) communicating, from the one or more server computing devices to the second computing device associated with the second user, data corresponding to an update of the interactive virtual environment which includes an update to the second element based on the first user's interaction with the virtual control board; and (q) effecting display, at the display device associated with the second computing device, of the interactive virtual environment including the virtual control board updated to reflect the modification of the existing second element of the interactive virtual environment based on the interaction with the virtual control board.

20. One or more non-transitory computer readable media containing computer executable instructions for performing the method of claim 19.

\* \* \* \* \*